United States Patent [19]

Vinciarelli

[11] Patent Number: 5,659,460
[45] Date of Patent: Aug. 19, 1997

[54] SWITCH CONTROL IN QUANTIZED POWER CONVERTERS

[75] Inventor: Patrizio Vinciarelli, Boston, Mass.

[73] Assignee: VLT Corporation, San Antonio, Tex.

[21] Appl. No.: 334,256

[22] Filed: Nov. 3, 1994

[51] Int. Cl.[6] .................................................. H02M 3/335
[52] U.S. Cl. ............................. 363/21; 363/97; 323/288
[58] Field of Search ........................... 363/21, 97; 323/235, 323/288

[56] References Cited

U.S. PATENT DOCUMENTS

| | | | |
|---|---|---|---|
| 4,415,959 | 11/1983 | Vinciarelli | 363/21 |
| 4,642,743 | 2/1987 | Radcliffe | 363/56 |
| 4,648,020 | 3/1987 | Vinciarelli | 363/71 |
| 4,677,366 | 6/1987 | Wilkinson et al. | 323/222 |
| 4,720,667 | 1/1988 | Lee et al. | 323/271 |
| 4,720,668 | 1/1988 | Lee et al. | 323/271 |
| 4,800,477 | 1/1989 | Esposito | 363/17 |
| 4,829,232 | 5/1989 | Erickson, Jr. | 323/290 |
| 4,841,220 | 6/1989 | Tabisz et al. | 323/282 |
| 4,857,822 | 8/1989 | Tabisz et al. | 323/282 |
| 4,940,929 | 7/1990 | Williams | 323/222 |
| 4,959,764 | 9/1990 | Bassett | 363/16 |
| 5,264,782 | 11/1993 | Newton | 323/288 |
| 5,315,496 | 5/1994 | Okochi et al. | 363/21 |
| 5,321,348 | 6/1994 | Vinciarelli et al. | 323/222 |

FOREIGN PATENT DOCUMENTS

| | | | |
|---|---|---|---|
| 0049633 | 4/1982 | European Pat. Off. | H02P 13/22 |
| 0349080 | 1/1990 | European Pat. Off. | H02M 3/335 |

OTHER PUBLICATIONS

Todd et al., "Practical Resonant Power Converters–Theory and and Application", Powertechnics Magazine, May 1986, vol. 2, No. 5, pp. 29–35.

Barbi et al., "Sinusoidal Line Current Rectification At Unity Power Factor With Boost Quasi–Resonant Converters", APEC '90 Conference Proceedings, Mar. 1990, Los Angeles, U.S.A., pp. 553–562.

Sebastian et al., "A Very Simple Method To Obtain One Additional Fully Regulated Output In Zero–Current–Switched Quasiresonant Converters"; PESC '90 Conference Proceedings, vol. II, Jun. 1990, San Antonio, Texas, USA; pp. 536–542.

Andreycak, "1 MHz 150W Resonant Converter Design Review", A24–A2–22.

Mammano, "Resonant Mode Converter Topologies—Additional Topics," Unitrode Power Supply Design Seminar, SEM–700 Handbook, 1990, P3–1–P3–12.

Hua et al., "A New Class of Zero–Voltage Switched PWM Converters," High–Frequency Resonant & Soft–Switching PWM Converters, vol. IV, VPEC Publication Series, 1991, p. 193 no page #5.

*Primary Examiner*—Peter S. Wong
*Assistant Examiner*—Shawn Riley
*Attorney, Agent, or Firm*—Fish & Richardson P.C.

[57] ABSTRACT

In connection with converting power from an input source for delivery to a load, a quantized converter has a switch which is controlled to undergo transitions between conductive and non-conductive states in each of a series of converter operating cycles. A switch controller reduces an error between (i) an actual time of occurrence of a particular one of the transitions in one of the operating cycles and (ii) a desired time of occurrence of the particular transition, based upon information about a prior error in timing which occurred in a previous one of the operating cycles.

60 Claims, 23 Drawing Sheets

$$I_p = \frac{I_{S1}}{N} + I_{mag\,1}$$

$$I_p = \frac{I_{S1}}{N} + I_{mag1}$$

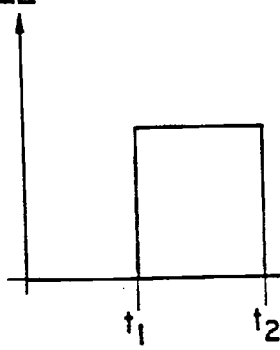
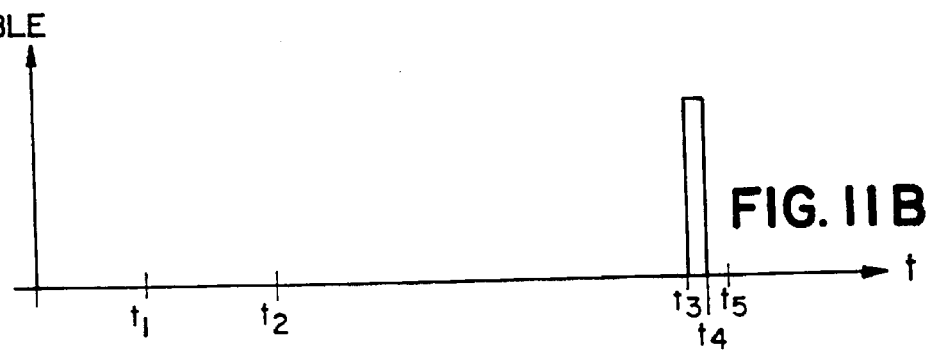
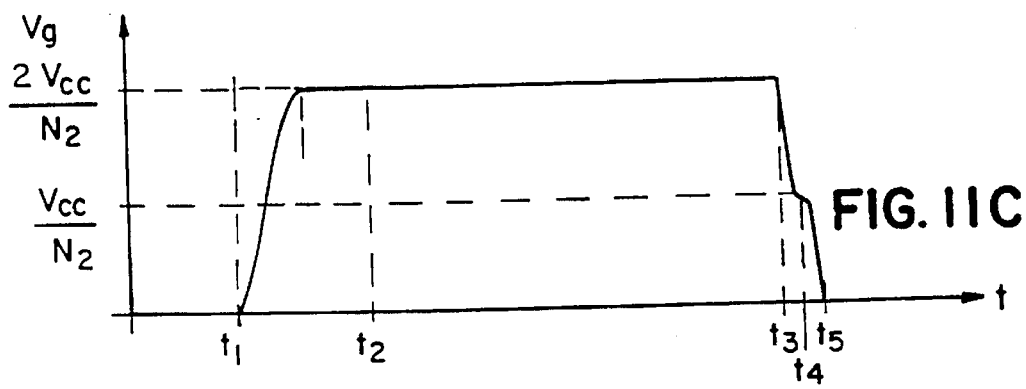
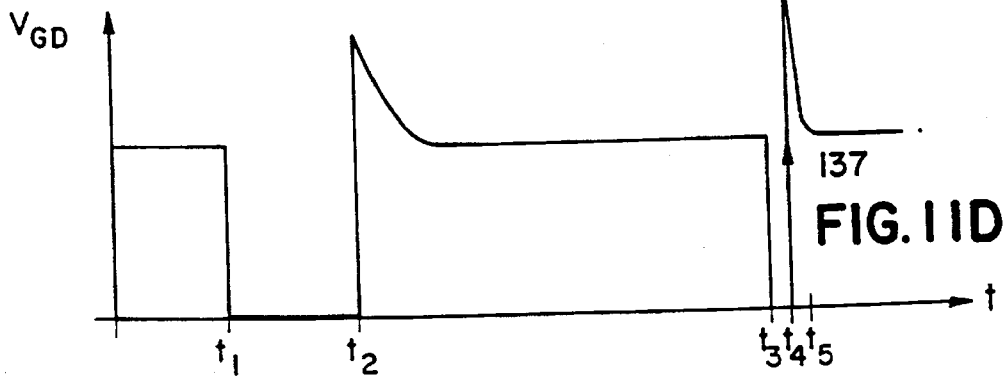

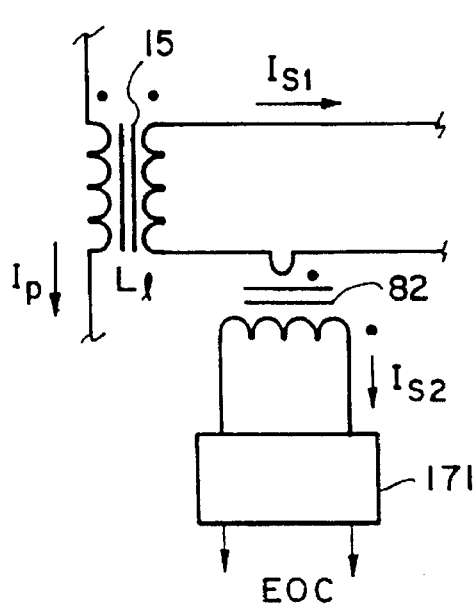
FIG. 12 A
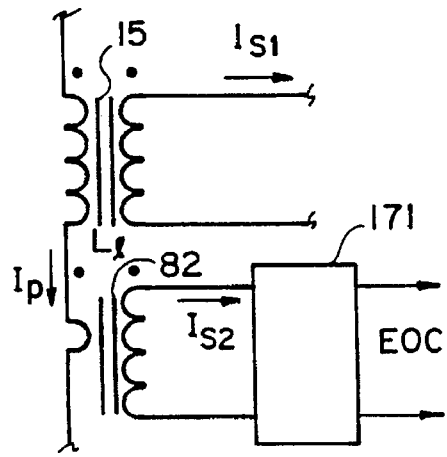
FIG. 12 B
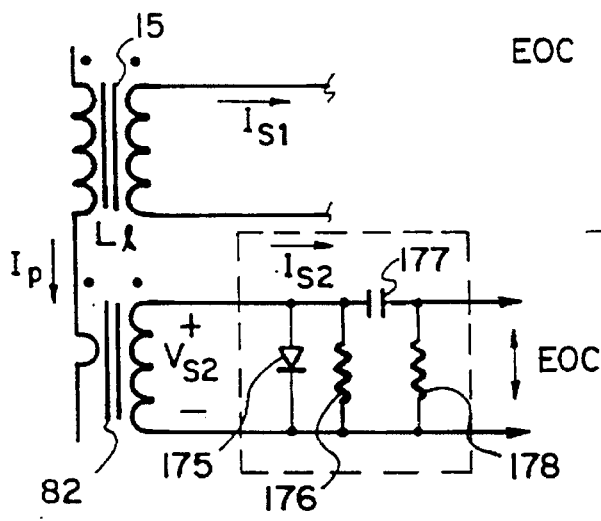
FIG. 12 C
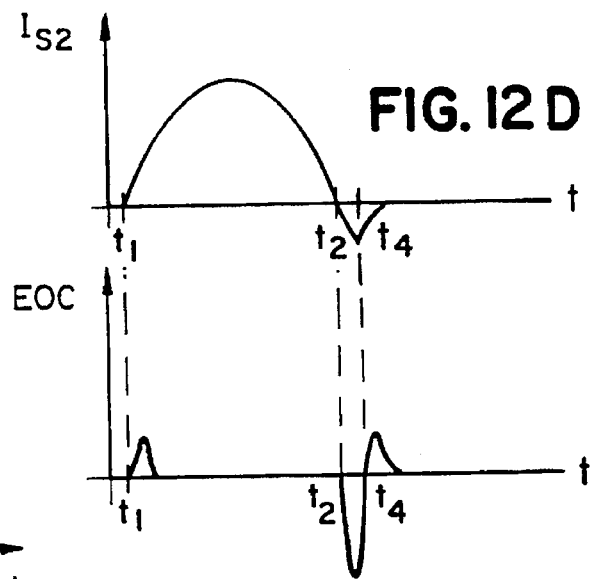
FIG. 12 D
FIG. 12 E

[5,659,460]

SWITCH CONTROL IN QUANTIZED POWER CONVERTERS

BACKGROUND

This invention relates to switch control in quantized power converters.

Switching power converters transfer power from an input source to a load by closing and opening a switch during each of a series of converter operating cycles. It will be useful to broadly separate such converters into two categories: PWM (pulse-width modulated) converters in which the rise and fall of switch current and voltage during switch transitions (e.g., changes between conductive and a non-conductive states) are theoretically instantaneous and in which there is no natural time constant built into the converter which smoothes the rise and fall of switch current or voltage during each converter operating cycle; and a class of converters, which will be referred to collectively herein as "quantized converters," in which inductance and capacitance in the converter introduce a natural time constant for the rise and fall of switch voltage or current during each converter operating cycle.

One class of quantized converters, including those generally referred to as "resonant," "quasi-resonant," or "multi-resonant" types, are of the kind in which the switch current or voltage rise and fall with a natural time constant throughout essentially the entire time that the switch is opened or closed. This class of converters includes zero-current switching converters (see, for example, Vinciarelli, "Forward Converter Switching at Zero Current," U.S. Pat. No. 4,415,959; Vinciarelli, et al, "Boost Switching Power Conversion," U.S. Pat. No. 5,321,348; Lee, et al, "Zero-Current Switching Quasi-Resonant Converters Operating in a Full-Wave Mode," all incorporated by reference) and zero-voltage switching converters (see, for example, Lee, et al, "Zero-Voltage Switching Quasi-Resonant Converters," U.S. Pat. No. 4,720,668; Tabisz, et al, Zero-Voltage Switched Multi-Resonant Converters Including the Buck and Forward Type," U.S. Pat. No. 4,857,822, all incorporated by reference). In such converters the inductance and capacitance perform two important functions: they set a characteristic time scale for the smooth rise and fall of voltages and currents within the converter during each converter operating cycle, and they create switch conditions during an operating cycle when the switch may be opened or closed at zero voltage or current. Another class of quantized converters, which blend PWM and quantized characteristics, include "soft-switching," "resonant transition" or "resonant switching" converters. In typical converters of this kind a natural time constant is exploited (sometimes in association with the transitioning of "auxiliary" switches) only during portions of the operating cycle which are near the times of transition of a main switching element; the effect of the natural time constant on currents or voltages during these portions of the cycle allows the main switching element to be transitioned with low switching loss. A converter of this kind (e.g., of the kind described in Hua, et al, "A New Class of Zero-Voltage Switched PWM Converters," High-Frequency Resonant and Soft-Switching PWM Converters, Volume IV of the VPEC Publication Series, 1991, p. 193, incorporated by reference), and converter operating waveforms, are shown in FIGS. 26 and 27, respectively. Other converters of this kind are described in Hua, et al, op. cit., p. 215 and in Mammano, "Resonant Mode Converter Topologies—Additional Topics," Unitrode Power Supply Design Seminar, SEM-700 Handbook, 1990.

In general, then, a quantized converter incorporates a natural time constant (which is typically significantly greater than the rise and fall times of the non-ideal switch in the converter) as a means of setting up switch conditions which are conducive to turning the switch on or off at low loss (e.g., at zero current or voltage). In contrast to pure PWM converters, in which the simultaneous presence of significant current and voltage during the opening and/or closing of non-ideal switching elements results in switching losses, the process of switching at zero voltage or current in quantized converters substantially reduces such losses. As a result, conversion efficiency is improved, converter operating frequency may be increased, and the size of energy storage elements within the converter, and hence the size of the converter itself, may be decreased.

In general, the extent to which the benefits of a quantized conversion can be achieved will depend, in part, on the accuracy of the timing of the opening and closing of the switching elements during the operating cycle. For example, FIG. 1 shows a zero-current switching (ZCS) converter 10 of the kind described in Vinciarelli, U.S. Pat. No. 4,415,959. The waveforms of the converter secondary and primary currents, Is1 and Ip, respectively, are shown in FIGS. 2A and 2B for the case where the switch 22 is opened at precisely the time at which the secondary current returns to zero (e.g., at time t=t4). Since the primary current, Ip, is the sum of the primary-reflected secondary current (e.g., Is1/N, where N is the turns ratio of the transformer 15) and the transformer magnetizing current, Imag1, the primary current will be equal to Ip(t4)=Imag1(t4) when the switch 22 is opened. In general, in a properly designed ZCS converter, the value of Imag1(t4) is a very small fraction of the peak value of the current Ip and the losses associated with opening the switch at t=t4 will be small. If the switch is opened too soon, however, e.g., at time t=te in FIG. 3A, then the switch will interrupt a current, Ip(te), which may be substantially greater than Imag1(t4). If, on the other hand, as illustrated in FIG. 3B, the switch is opened too late, e.g., at times t=tm in FIG. 3B, then the switch will have to interrupt a current which is greater than the current Imag(t4). In either case, the inaccuracy in switch timing will result in increased switching losses, reduced conversion efficiency and increased converter conducted and radiated noise.

In another example, a schematic and waveforms for a prior art zero-voltage switching (ZVS) forward converter 7 (Tabisz, et al, U.S. Pat. No. 4,857,822) are shown in FIGS. 21 and 22. In the ZVS converter the closing of the switch 11 takes place at zero voltage (e.g, at time t=t4, FIG. 22). If the switch is closed too soon or too late, relative to time t4, the voltage across the switch, Vsw, will be non-zero when the switch closes and this will result in problems similar to those cited above for inaccurate switch timing in the ZCS converter.

One prior art method of generating a switch turn-off signal in a ZCS converter is shown in FIG. 1. In the Figure, a switch turn-off sensor 80 includes a current transformer 82, a pair of diodes 84, 86 and a bias source 88. When the switch 22 is closed, at time t=t1, a primary current, Ip, flows in the current transformer primary winding 83. This induces a current, Is2, to flow in the current transformer secondary winding 85 and in diodes 84, 86, resulting the voltage Vt having a negative value equal to one diode drop. Since, as illustrated in FIG. 4B, the secondary current of the current transformer, Is2, is equal to the difference between the primary current, Ip (FIG. 4A), and the magnetizing current in the current transformer 82, Imag2 (also shown in FIG. 4A), the current Is2 will "lead" the current Ip and Is1 will reverse at time t=tx, prior to time t=t4 (e.g., the time at which the secondary current, Is1, of transformer 15 returns to zero). As Is2 reverses, the diodes 84, 86 cease conducting and the voltage Vt goes sharply positive via the parasitic impedances of the diodes. This positive voltage causes the output of the comparator 71 to go positive, resetting the latch 72 and turning off the switch. In practice, the design of the current transformer is adjusted to provide a time lead (e.g., t4-tx, FIGS. 4A and 4B) which compensates for circuit delays in non-ideal components, e.g., delays in the comparator 71 and latch 72 and the response time of the switch 22.

A prior art method for closing the switches 11,311 in the ZVS converters of FIGS. 21 and 26 is shown in FIG. 23. In the Figure, turn-off pulses reset flip-flop 19 and turn the switch off (e.g., at time t=t2, FIG. 22). When the switch voltage, Vsw, returns to zero at time t=t4, the rising edge of the output of comparator 13 sets edge-triggered flip-flop 19 turning the switch on.

SUMMARY

In general, in one aspect, the invention features circuitry for use in converting power from an input source for delivery to a load. In the circuitry, a quantized converter has a switch which is controlled to undergo transitions between conductive and non-conductive states in each of a series of converter operating cycles. A switch controller reduces an error between (i) an actual time of occurrence of a particular one of the transitions in one of the operating cycles and (ii) a desired time of occurrence of the particular transition, based upon information about a prior error in timing which occurred in a previous one of the operating cycles.

Implementations of the invention may include the following features. The quantized converter may be a zero-current switching converter or a zero-voltage switching converter, or a resonant switching converter. The desired time may correspond to a time, during the operating cycle, at which a flow of current within the converter reaches a predetermined value; or a flow of current indicative of the flow of current in the switch reaches a predetermined value; or a flow of current in the switch reaches a predetermined value; or a voltage in the converter reaches a predetermined value; or the voltage across the switch reaches a predetermined value. The predetermined value may be essentially zero. The error may be reduced essentially to zero. The controller may detect a time during an operating cycle at which a transition occurs; or a time within one of the operating cycles at which a current indicative of the flow of current in the switch reaches a predetermined value; or a time within one of the operating cycles at which a voltage indicative of the voltage across the switch reaches a predetermined value. The controller may include a first detector for detecting a first time within one of the operating cycles at which a transition of the switch occurs. A second detector may detect a second time within the one of the operating cycles at which a current indicative of the flow of current in the switch reaches a predetermined value; or at which a voltage indicative of the voltage across the switch reaches a predetermined value. A control element may control the first time in a subsequent one of the operating cycles based upon the difference between the first time and the second time.

The controller may compare a first signal, Vr, indicative of an elapsed time within the one of the operating cycles, to a second signal, Vsc, and may initiate the occurrence of the particular one of the transitions when the first signal becomes equal to the second signal. The second signal, Vsc, may be set equal to a third signal, Vs, which is adjusted by the controller based upon the value of the prior error. The elapsed time may be the difference between the actual time of occurrence and the time of occurrence of another transition during the one of the operating cycles. The controller may adjust the third signal, Vs, to reduce the error to essentially zero. The value of the second signal, Vsc, may be set equal to: (i) the value of the third signal, Vs, whenever the value of Vs is within a range defined by minimum and maximum limits, Vscmin and Vscmax, respectively; (ii) Vscmin, whenever Vs Vscmin; (iii) Vscmax, whenever Vc>Vscmax. The values of Vscmin and Vscmax may be arranged to set limits on the minimum and maximum times that the switch can remain in one of the states. The limits may set minimum and maximum values of the on-time for the switch. The values of the limits, Vscmin and Vscmax, may be functions of the value of the input source. Initiation of another of the operating cycles may be prevented for a period of time following the actual time of occurrence. The converter duty cycle may prevented from assuming a value which would cause the voltage across the switch to exceed a predetermined value, Vp. When the the quantized converter is a zero-current switching converter, the steady state operation of the converter may be prevented under non-zero-current switching conditions.

The first signal may increase as the elapsed time increases. The second signal may be increased if the error is negative and decreased if the error is positive.

The rate-of-change of voltage across the switch or the rate of change of current may be detected. The switch may be a MOSFET and the time when the gate-to-source voltage crosses the threshold voltage of the MOSFET may be detected. There may be an isolation transformer and reset circuitry connected to a winding of the transformer for resetting the magnetic core of the transformer, and the commutation of the flow of magnetizing current between the winding and the reset circuitry may be detected. A current transformer may be used for the detecting. The flux induced by a flow of current in a magnetic component may be detected. The converter may include a leakage-inductance transformer and the leakage flux which emanates from the transformer may be detected. A conductive loop may be placed in the vicinity of the transformer for the detecting.

In general, in other aspects, the invention includes related methods, and the controller itself.

A variety of advantages of the invention, and other features, will become apparent from the following description and from the claims.

DESCRIPTION

FIGS. 11A through 11D show waveforms for the gate driver included in the converter of FIG. 9.

FIGS. 12A through 12C show alternate methods of sensing when the current in a ZCS converter returns to zero.

FIGS. 12D and 12E show waveforms for the circuit of FIG. 12C.

DETAILED DESCRIPTION

Figure 2A:
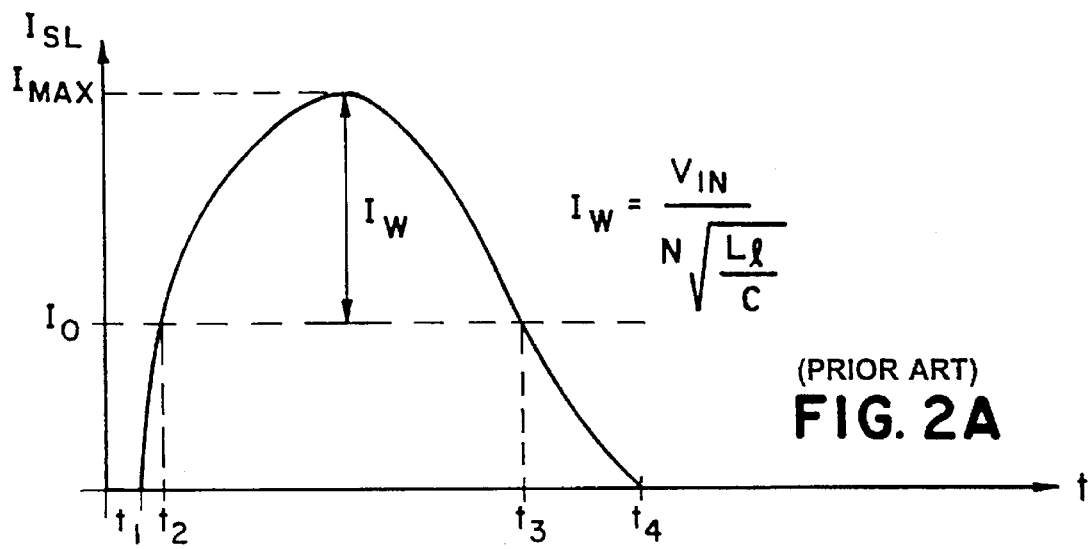
FIGS. 2A through 2C show waveforms for the converter of FIG. 1.
Figure 2B:
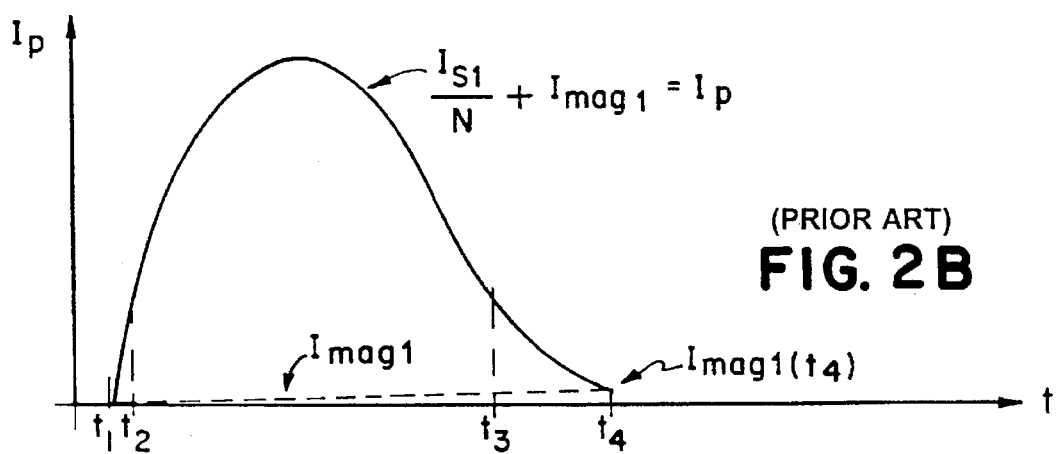
Figure 2C:
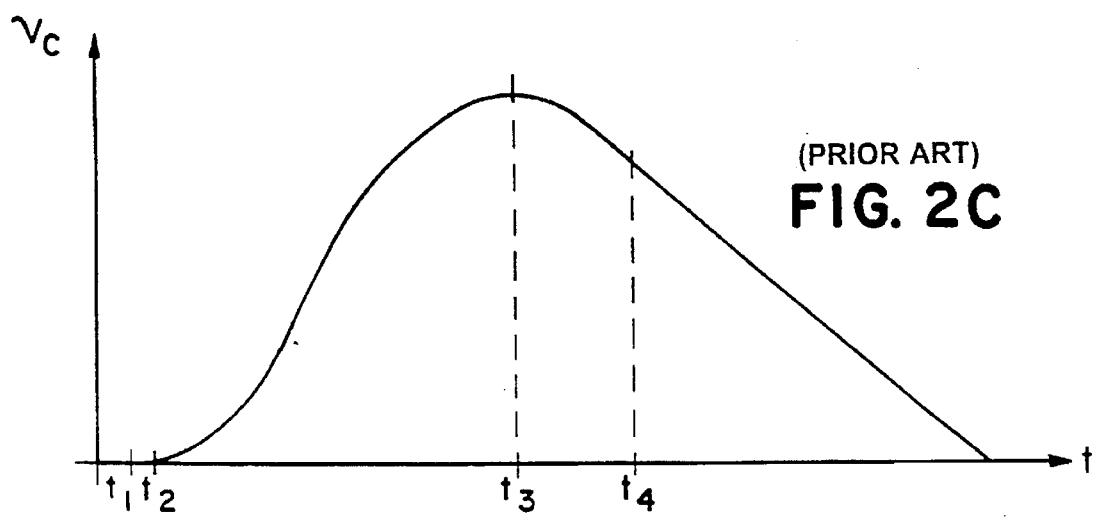
Figure 3A:
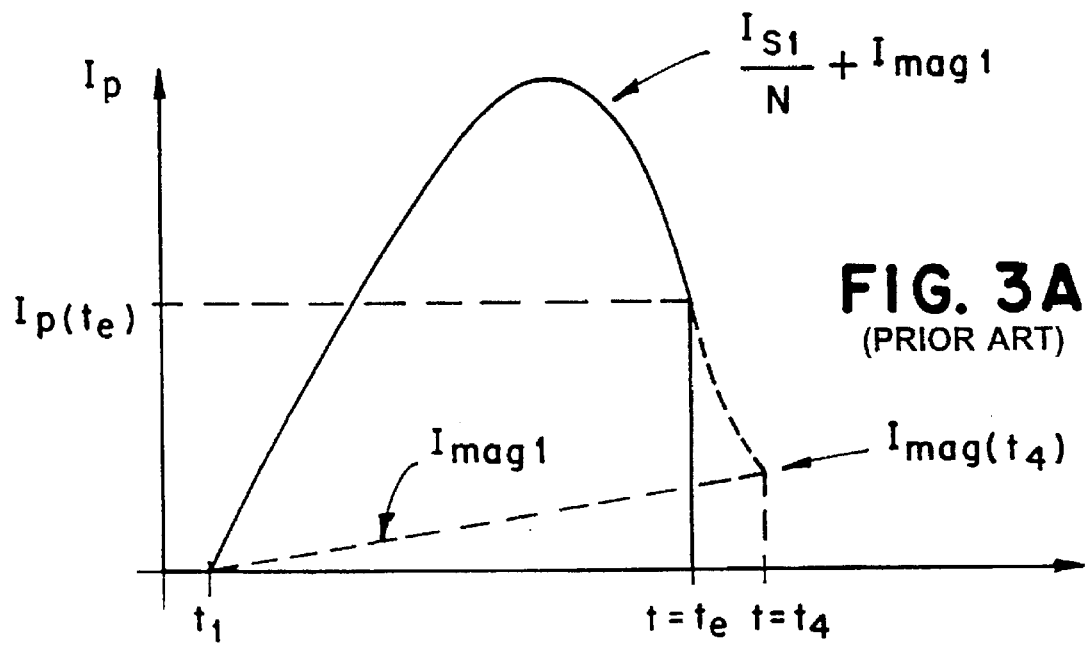
FIGS. 3A and 3B shows waveforms for the converter of FIG. 1.
Figure 3B:
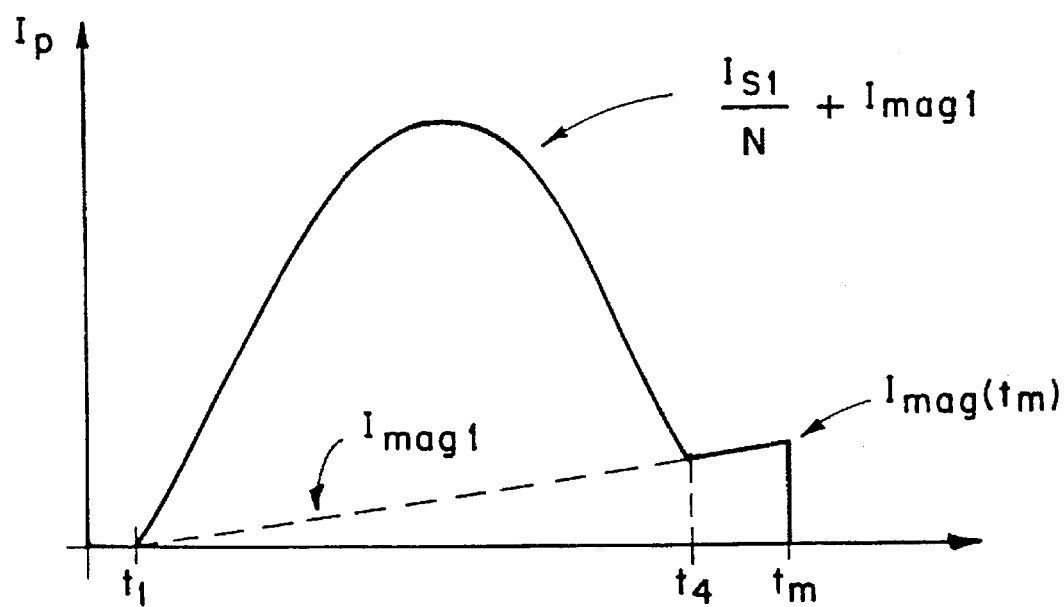

In a quantized converter the point during each operating cycle at which a switch transition is to occur is determined, either in whole or in part, by a natural time constant within the converter which sets the time scale for the rise and fall in switch voltages or currents. Thus, for example, in the isolated zero-current switching converter of FIG. 1, it would generally be deemed desirable to open the switch at precisely the time at which the secondary current returns to zero, since, as previously discussed with reference to FIGS. 1, 2 and 3, it is at this time that the switch will be called upon to interrupt the minimum value of the current Ip. In the isolated zero-voltage switching converter of FIG. 21, however, the switch should be closed at precisely the time that the switch voltage returns to zero (e.g., at t=t4, FIG. 22). In the resonant transition converter of FIG. 26, the switch "S" 311 should be closed precisely at time T3 (FIG. 27) when the voltage across the switch returns the zero.

Figure 4A:
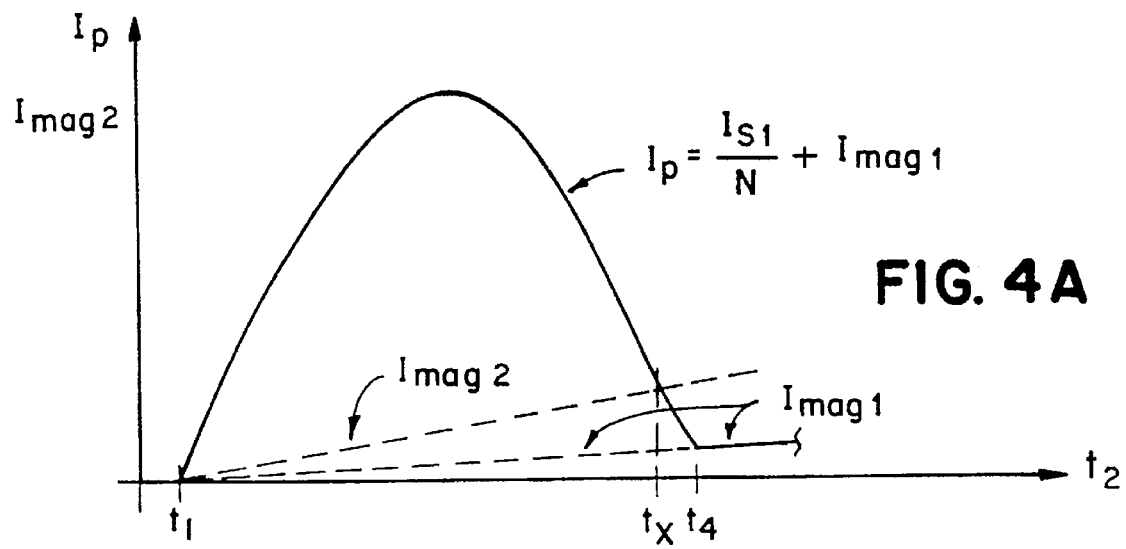
FIGS. 4A and 4B show waveforms associated with the current transformer in the converter of FIG. 1.
Figure 4B:
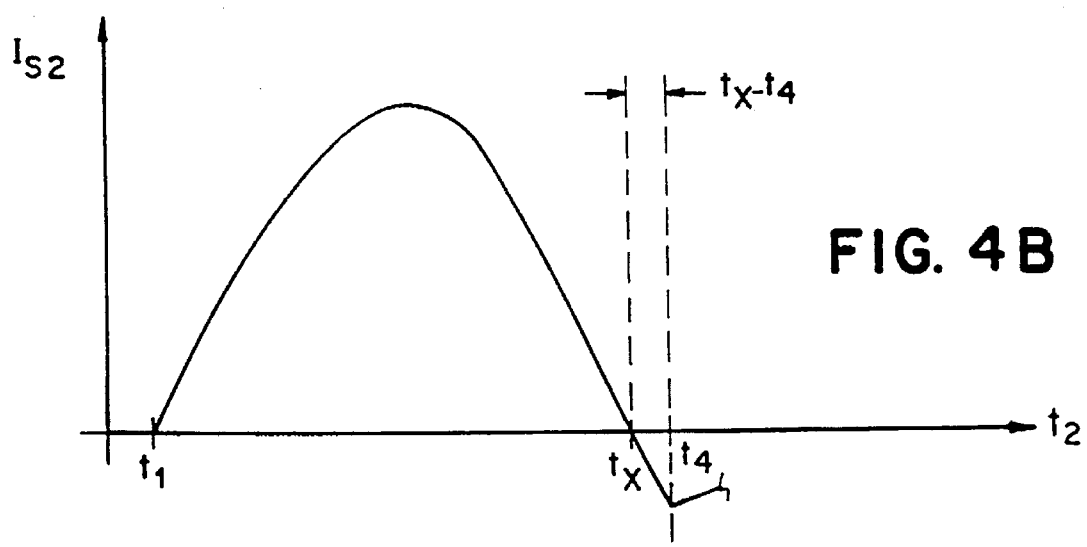
Figure 23:
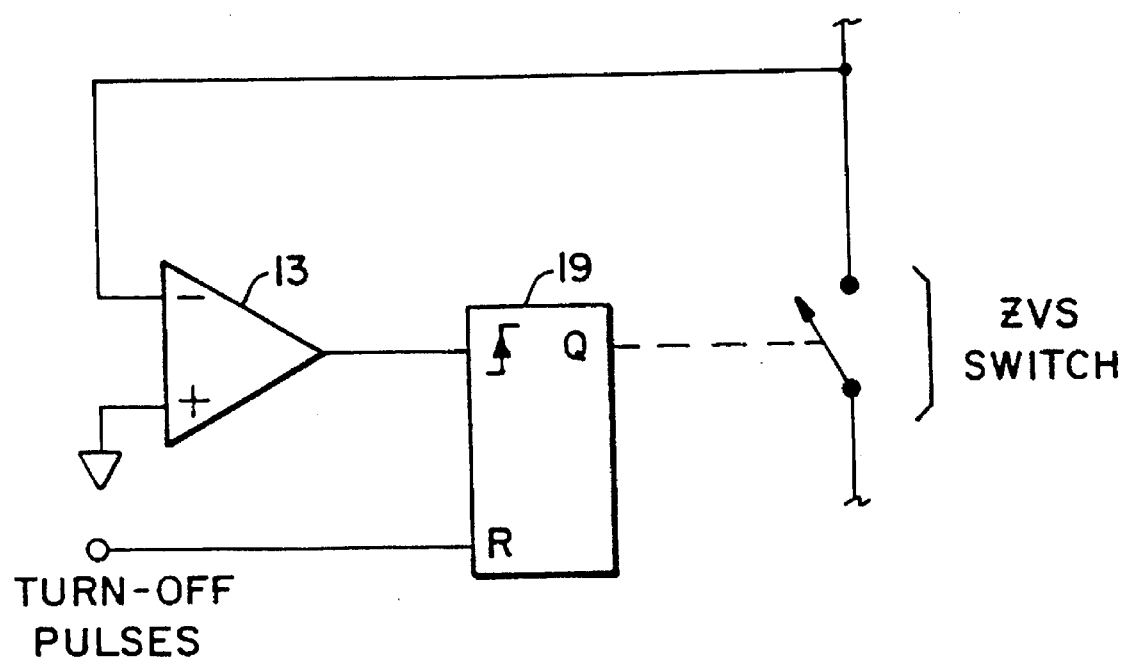
FIG. 23 shows a prior art switch controller for the converter of FIG. 21.

Prior art methods for generating switch control signals, in which a measurement of current or voltage is used to generate the signal directly, cannot, in general, ensure that switching will always occur at the optimal time. For example, in the current sensor 80 of FIG. 1, previously described, the value of "time lead" (e.g., the difference between tx and t4 in FIG. 4) will be a function of the characteristics of the magnetic properties of the current transformer 82 and the characteristics of the diodes 84, 86, both of which will exhibit unit-to-unit variations and variations with environmental factors, such as temperature. On the other hand, the amount of time lead required will be a function of circuit delays associated with circuit elements (e.g., comparator 71, latch 72), the characteristics of the switch 22 and both the level of converter loading and converter input voltage (because both the time t4, and the rate-of-change of current at t=t4 (FIG. 2) are dependent upon both Io and Vin). Thus, since both the time lead characteristics of the sensor, and the delay characteristics of the circuitry for which the time lead is supposed to compensate, vary independently of each other, and since there is no mechanism for adjusting one as a function of the other, it is essentially impossible for such an arrangement to provide for optimal switch turn-off timing over any but a narrow range of converter operating and environmental conditions. A similar argument can be made for the switch control circuitry of FIG. 23; timing of the closure of the switches 11, 311 in the ZVS converters of FIGS. 21 and 26 will exhibit inaccuracies owing to unit-to-unit and environmentally induced variations in component values, thresholds, tolerances and delays in both the switch control circuitry and the switch.

A switch controller according to the present invention is able to regulate the timing of switch transitions in a quantized converter to very closely correspond to the optimum switching time, and will do so despite variations in either the values of circuit element values or in circuit delays caused by converter operating and environmental conditions.

Figure 1:
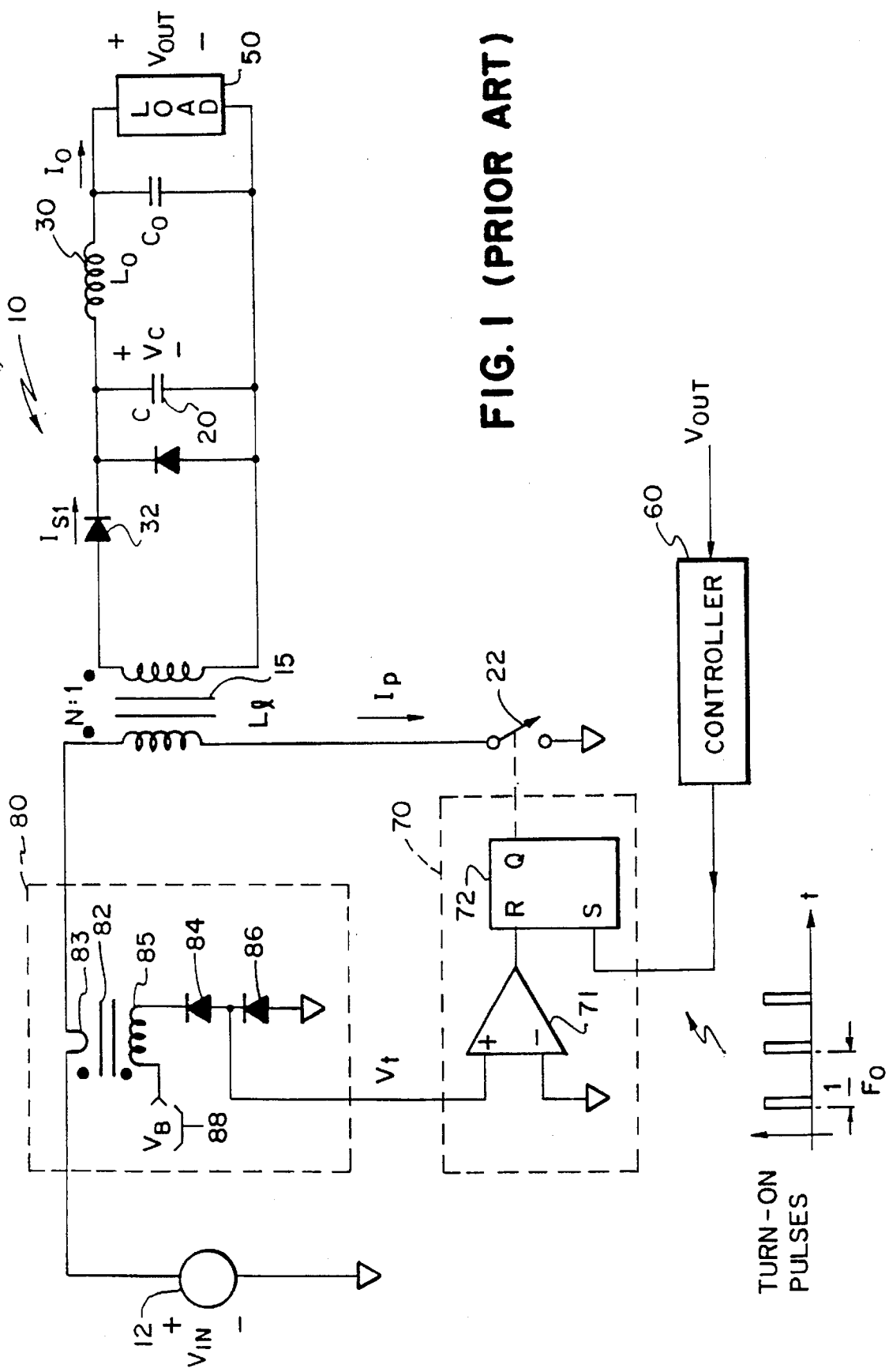
FIG. 1 is a circuit diagram of a prior art zero-current switching converter.
Figure 5:
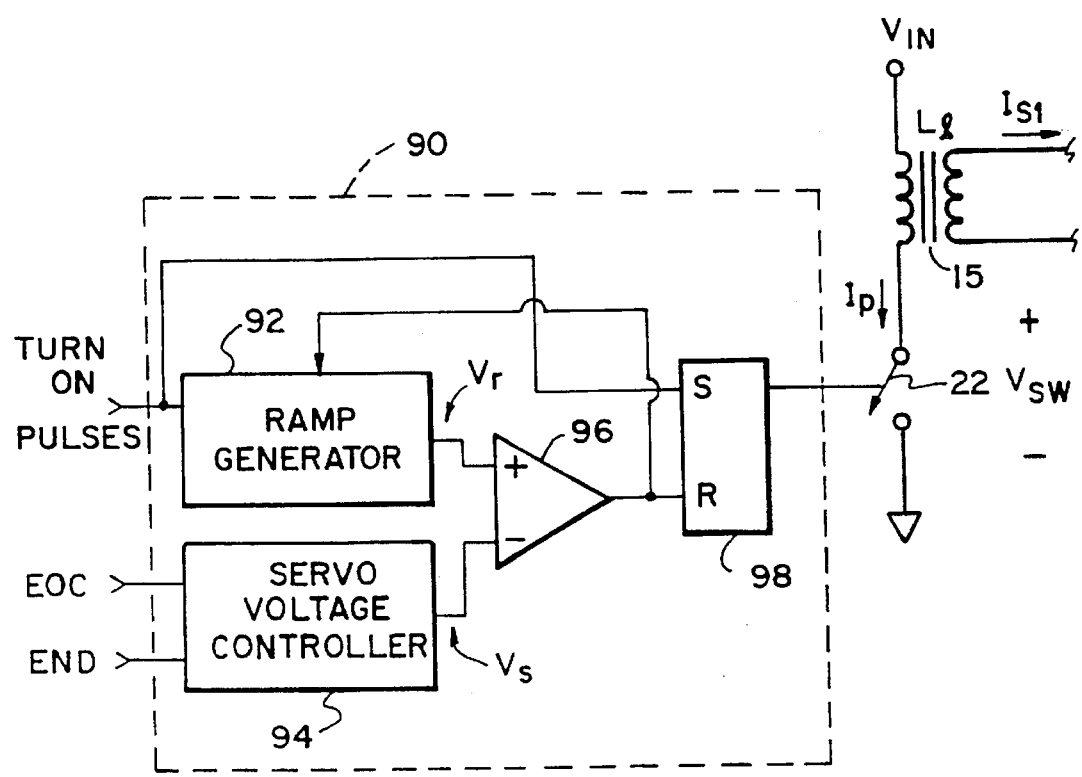
FIG. 5 shows a block diagram of a switch controller according to the present invention.
Figure 6:
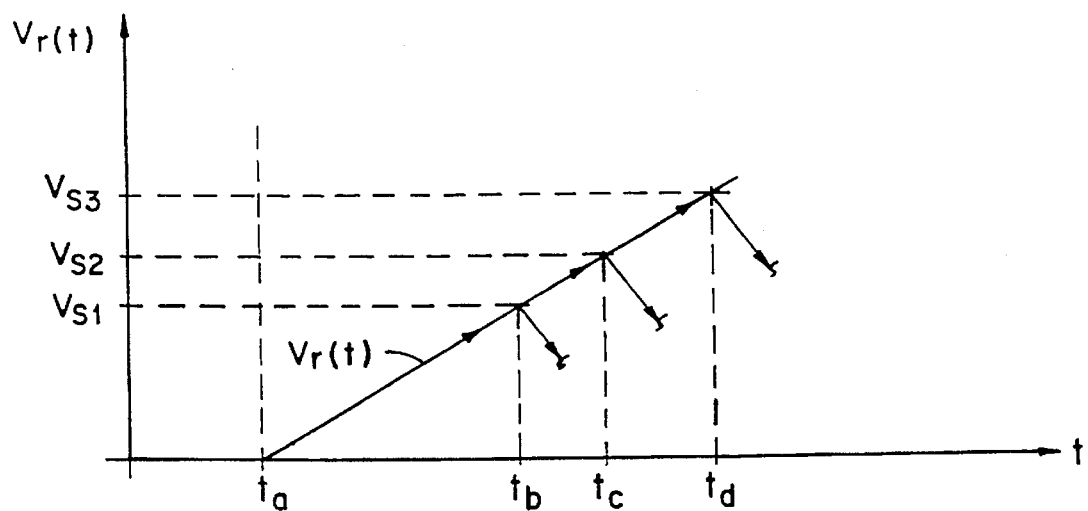
FIG. 6 shows a waveform for the switch controller of FIG. 5

The operating principles of such a switch controller are illustrated, for use with a ZCS converter, in FIGS. 5 through 8. In FIG. 5 a portion of the ZCS converter 10 of FIG. 1 is shown in which the switch controller 70 of FIG. 1 is replaced with a switch controller circuit 90 according to the present invention. The switch controller 90 consists of a ramp generator 92, a servo voltage controller 94, a comparator 96 and a flip-flop 98. The output of the flip-flop controls the switch 22: when the flip-flop is set the switch is enabled; when it is reset the switch is disabled. We initially assume that the flip-flop is reset, the output of the ramp generator, Vr, is at zero volts and the output of the servo voltage controller, Vs, is at some value greater than zero. At time t=ta a turn-on pulse is delivered to the switch controller 90, setting the flip-flop, enabling switch 22 and enabling the ramp generator. As shown in FIG. 6, when the ramp generator is enabled the voltage Vr begins increase linearly. When Vr becomes equal to Vs the output of the comparator 96 goes high, signaling the ramp generator to begin decreasing Vr, and resetting the flip-flop, thereby disabling the switch. As illustrated in FIG. 6, different values of Vs (e.g., Vs1, Vs2 and Vs3) will result in the switch being disabled at different times (e.g., tb, tc and td); the length of time that the switch is enabled increases as Vs increases and vice-versa. It should be noted that the terms "disabling" and "enabling," as applied to controlling the switch 22, refer to the delivery of a signal to the switch which is intended to cause the switch to turn off or turn on; the times at which the switch is disabled or enabled may, or may not, correspond to the times at which the switch actually becomes non-conductive or conductive. For example, in a bipolar transistor the switch is "disabled" by interrupting the flow of base current. However, storage or delay times in such a device will typically result in the switch staying in a conductive state for a significant period of time following generation of the disable signal.

Two signals, EOC and END, are delivered to the servo voltage controller 94. The signal EOC is indicative of the time during the cycle at which the current in the secondary of the isolated ZCS converter, Is1, goes to zero; the signal END is indicative of the time during the cycle at which the switching element 22 becomes non-conductive. The servo controller adjusts the value of the servo voltage Vs based upon the relative timing of the signals EOC and END. If the signal END precedes the signal EOC the value of Vs is increased, thereby increasing the length of time that the switch is enabled during the next cycle; if the signal EOC precedes the signal END, the value of Vs will be reduced, thereby decreasing the length of time that the switch is enabled during the next cycle. That this will result in Vs converging on a value which will result in the switch becoming non-conductive at essentially the same instant in time that the secondary current goes to zero is illustrated with reference to FIGS. 7 and 8.

Figure 7A:
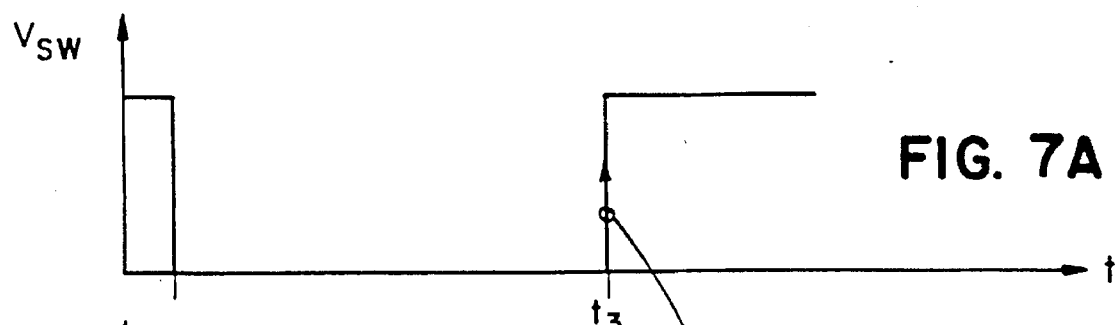
FIGS. 7A through 7E show waveforms for the circuit of FIG. 5 for a case in which the switch is turned off too late.
Figure 7B:
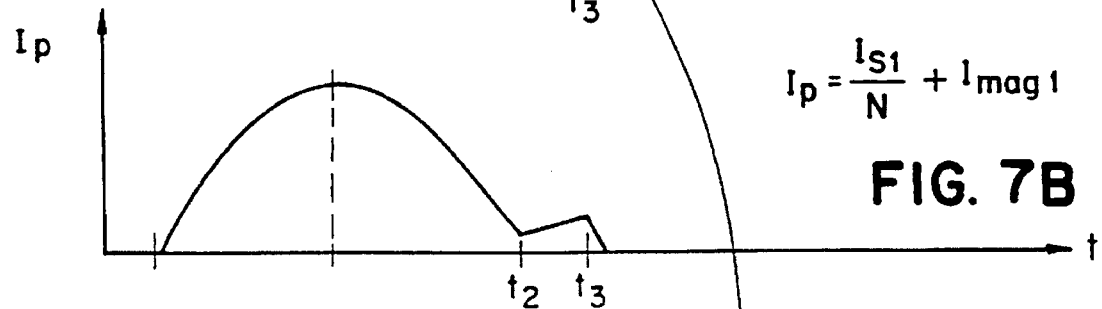
Figure 7C:
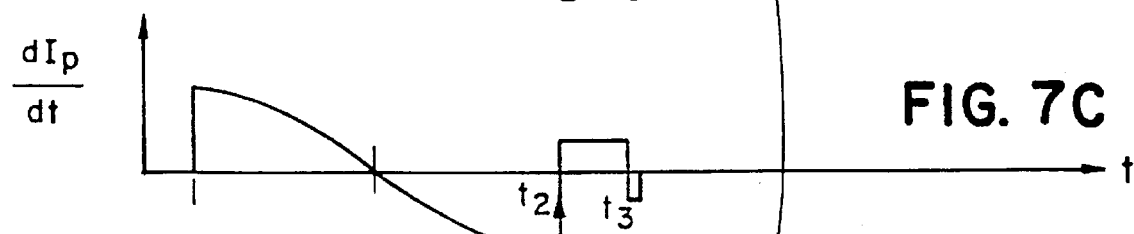
Figure 7D:
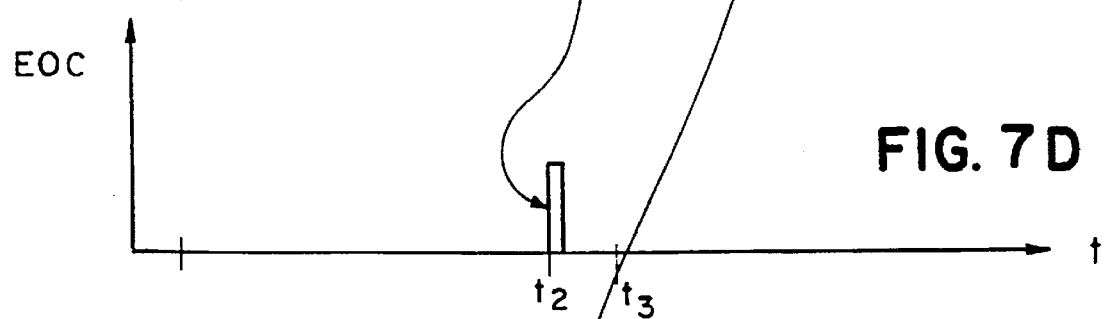
Figure 7E:
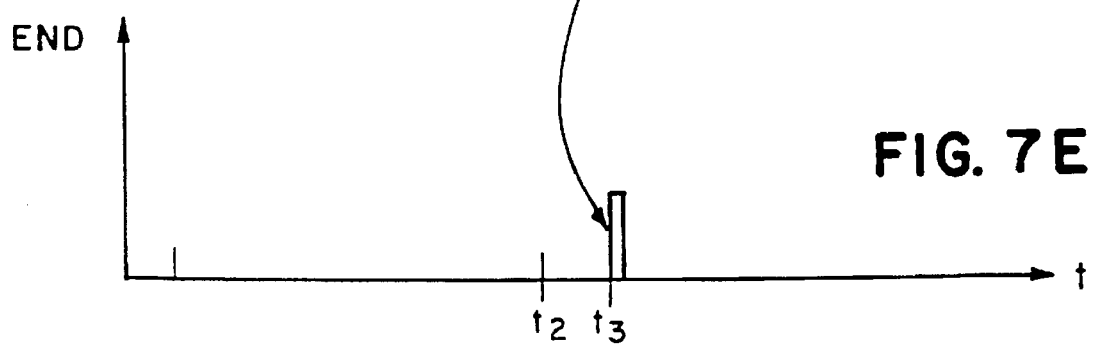

FIGS. 7A through 7E show waveforms for the operation of the circuit of FIG. 5 for a case in which the switch is turned off too late, i.e. the switch remains conductive beyond the time at which the secondary current returns to zero (e.g., time t=t2 in the Figure). As previously discussed, turning the switch off too late will result in the switch 22 continuing to carrying an increasing amount of magnetizing current (e.g., between times t2 and t3, FIG. 7B) during the time that it remains on after the secondary current returns to zero. However, the time derivative (e.g., a signal indicative of rate-of-change) of the primary current, as illustrated in FIG. 7C, will exhibit a positive going edge at the time that the secondary current goes to zero, and this positive going edge may be used to generate an EOC signal (FIG. 7D). When the switch becomes non-conductive, at time t=t3, the switch voltage will begin to rise (FIG. 7A) and the positive rate-of-change of voltage across the switch may be used to generate an END signal (FIG. 7E). The signal EOC will precede the signal END and, as noted above, the servo voltage controller will increment Vs to a higher value.

Figure 8A:
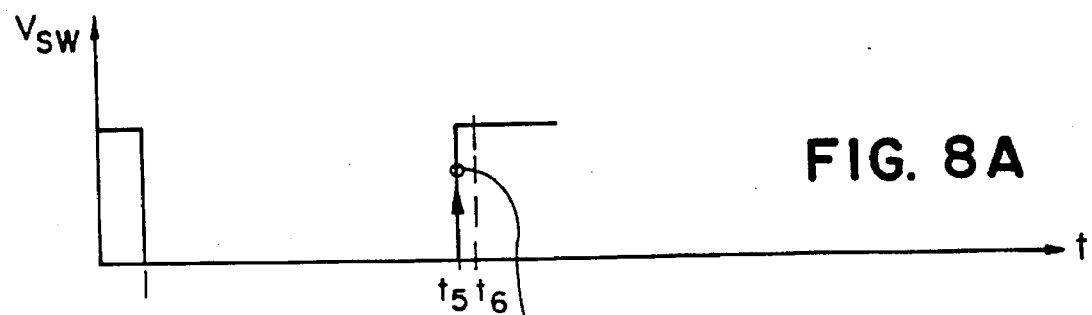
FIGS. 8A through 8E show waveforms for the circuit of FIG. 5 for a case in which the switch is turned off early.
Figure 8B:
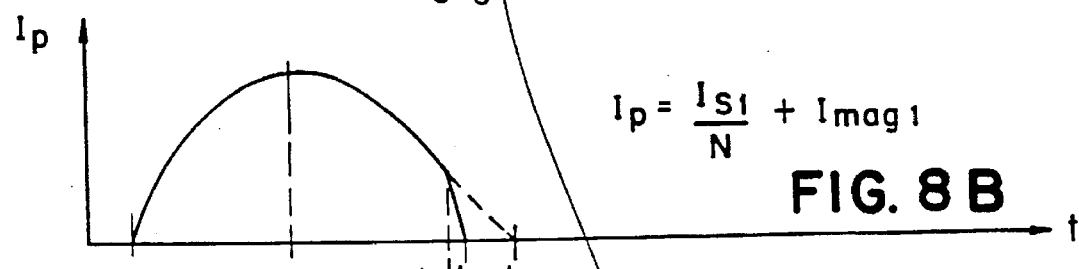
Figure 8C:
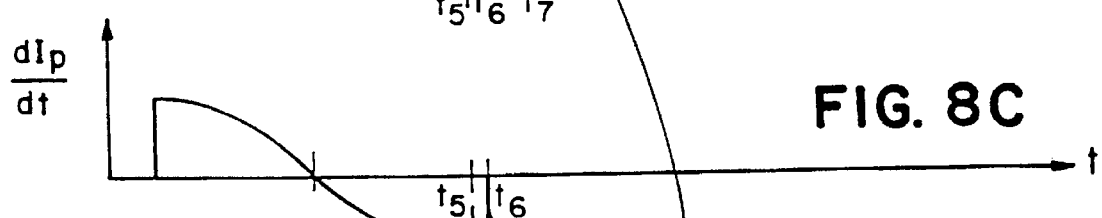
Figure 8D:
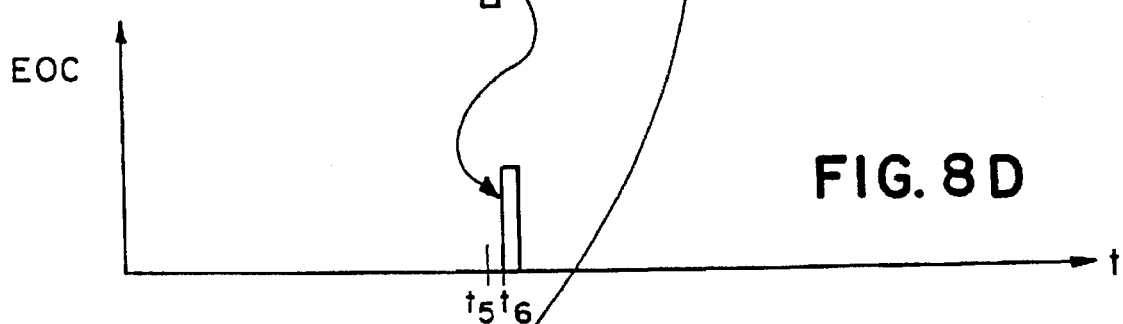
Figure 8E:
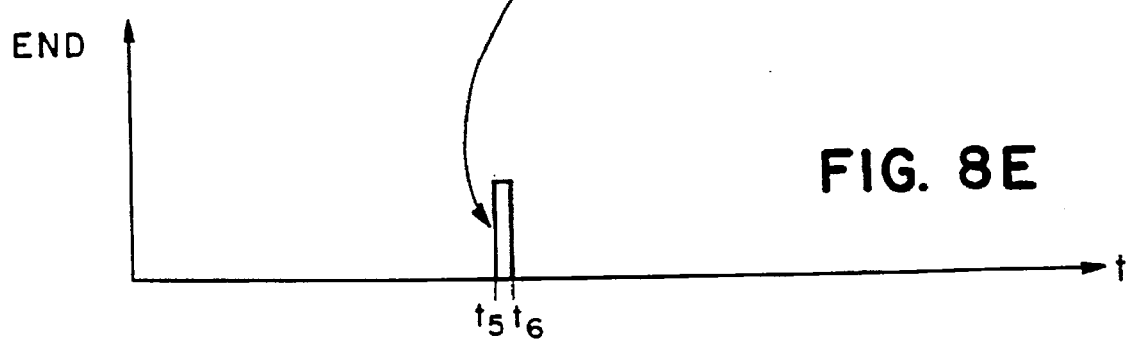

On the other hand, if the switch is turned off too early, i.e. the switch becomes non-conductive prior to the time at which the secondary current would otherwise naturally return to zero, then the signal timing will be as shown in FIGS. 8A through BE. FIGS. 8A and 8B show the switch voltage, Vsw, rising and the primary current, Ip, being "chopped" prior to the time at which the secondary current in the converter would have naturally returned to zero (e.g., time t7, FIG. 8B). The positive rate of change of switch voltage at time t5 generates the signal END (FIG. BE). As the current decays in the switch (between times t5 and t6, FIG. 8B) the time derivative of the primary current (FIG. 8C) goes sharply negative. At time t6, Ip goes to zero, and the time derivative of Ip exhibits a positive edge which is used to generate the signal EOC (FIG. 8D). Thus, the signal END will precede the signal EOC, and, as noted above, the servo voltage controller will increment Vs to a lower value.

By monitoring the presence of an error in the timing of the switch (e.g., the difference between the time when the switch becomes non-conductive and the time when the secondary current goes to zero) and using the presence of this error to reduce the amount of error in subsequent cycles, a switch control system according to the present invention will automatically compensate for timing errors which might be caused by variations in circuit delays, variations due to environmental or operating conditions, changes in input voltage or load, imposition of abnormal operating conditions, or other causes. As a result, converter efficiency is improved, and converter noise and switch stresses are reduced. In the specific switch control process described above, a closed loop feedback technique was used to adjust the time at which the switch is disabled so as to cause the switch to become non-conductive at essentially the same instant in time that the secondary current returns to zero. Other techniques for error reduction may also be used (e.g., feedforward control). In general, however, the process of using the presence of a timing error during a particular converter operating cycle as a means of reducing the error in subsequent cycles, will be referred to as "servoregulating." Thus, switch control systems according to the present invention may be described as systems which servoregulate a reduction in the error of the timing of a switching element in a quantized converter.

Figure 9:
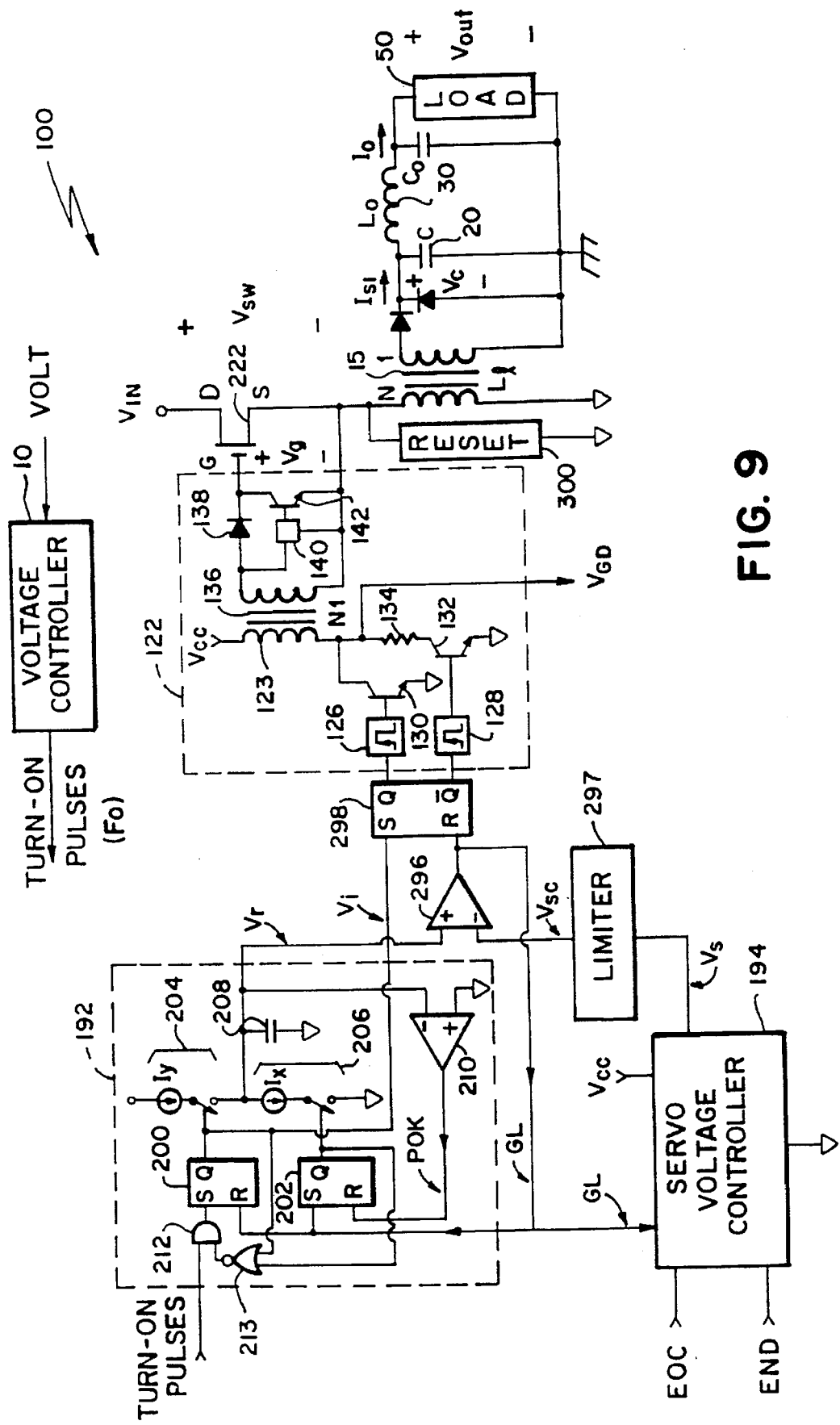
FIGS. 9 and 9A are, respectively, schematics of isolated and non-isolated embodiments of ZCS converters which include a servo voltage controller according to the present invention.
Figure 10:
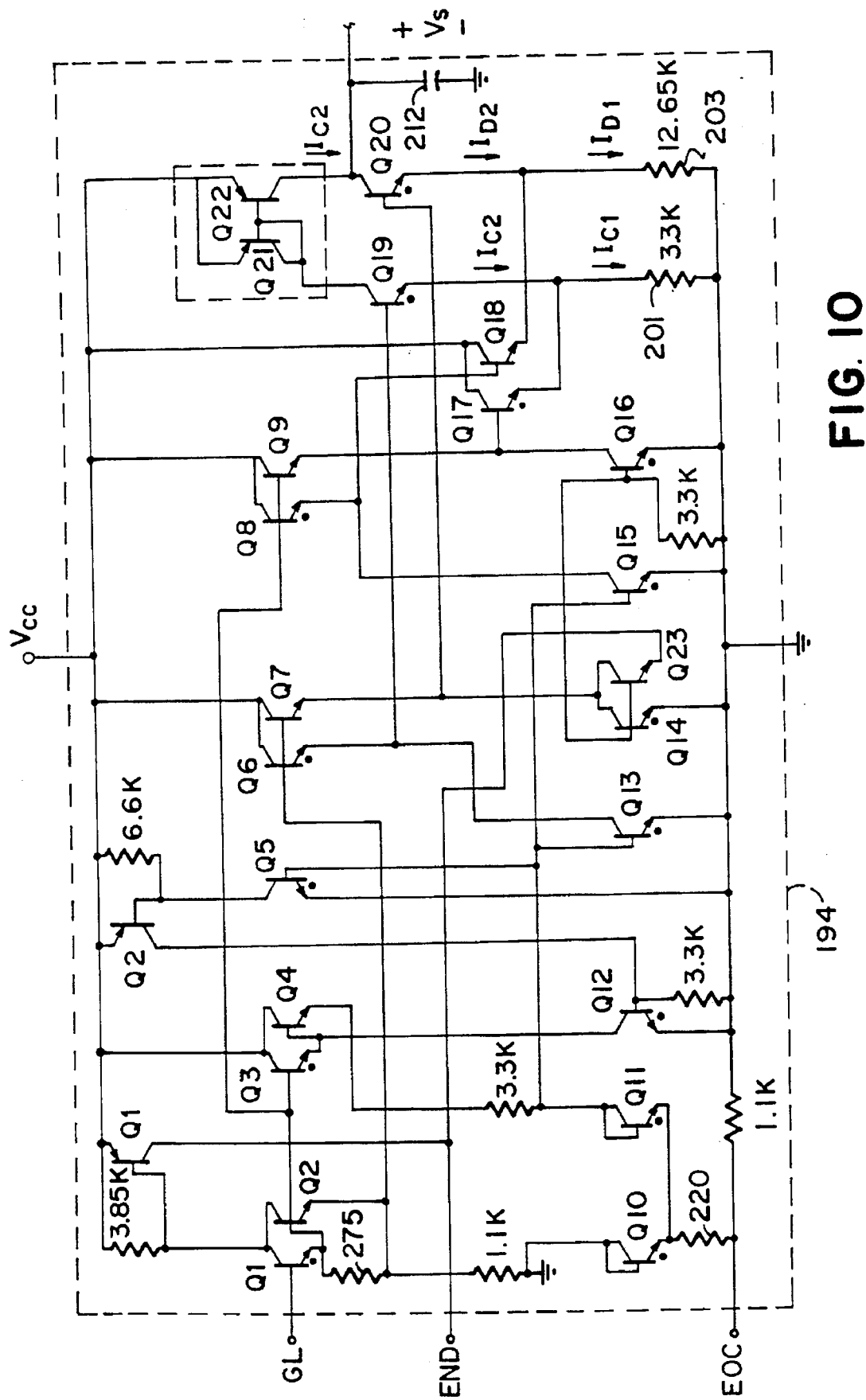
FIG. 10 is a schematic of a servo voltage controller.

FIG. 9 is a schematic of an embodiment of a ZCS converter 100 according to the invention which includes a servo voltage controller 194 (a schematic of which is shown in FIG. 10), a ramp generator 192, a MOSFET switch 222, a Limiter circuit 297, and a gate driver circuit 122. A reset circuit 300, of the kind described in Vinciarelli, "Optimal Resetting of the Transformer's Core in Single Ended Forward Converters," U.S. Pat. No. 4,441,146 (incorporated by reference), is also included.

The gate driver circuit 122 is of the kind described in Vinciarelli, "High Efficiency Floating Gate Driver Circuit Using Leakage-Inductance Transformer," U.S. patent application Ser. No. 07/805,474 (incorporated herein by reference). In operation, as indicated in the waveforms of FIG. 11, a "high energy" turn-on pulse initiates energy transfer from a bias voltage source 123 to the gate-to-source capacitance of the MOSFET 222 via the leakage inductance of the transformer 136. The "high energy" pulse is generated by impressing a bias voltage 123, Vcc, across the primary of leakage-inductance transformer 136 for a sufficient, but brief, period of time (e.g., by means of monostable 126, FIG. 11A), via a low impedance driver 130. This results in the gate-to-source voltage of the MOSFET ringing up to approximately twice the value of the secondary reflected value of the bias source 123, 2,Vcc/N2, where N2 is the ratio of the primary to secondary turns of the transformer 136. Once charged, the gate capacitance will be prevented from discharging by the diode 138. To turn the MOSFET off, another, "low energy," pulse is delivered to the driver logic 140 by connecting the bias source 123 in series with the transformer 136 primary winding for a short period of time (via monostable 128) by means of a high impedance driver (as indicated by the resistor 134 in series with the transistor switch 132). If the driver logic 140 senses that the switch 222 is turned on it will interpret the lower energy pulse as a disable command and will turn on transistor 142, discharging the gate of the MOSFET and rendering the MOSFET non-conductive.

As previously noted, one way to sense when a switching element becomes non-conductive is to measure the rate-of-change of voltage across the switch. This is useful for any kind of switching device, irrespective of delays which may exist between the time that the switch is disabled and the time that the switch subsequently becomes non-conductive. In certain types of switching devices, however, (for example MOSFET switches) there is essentially no delay between when the switch is disabled (as indicated by its gate-to-source voltage, Vg) and when the switch becomes non-conductive. If Vg is above the "threshold voltage" of the MOSFET, the device may be assumed to be conductive; if it is below the threshold voltage, the MOSFET may be assumed to be non-conductive. In the gate-driver circuit 122 of FIG. 9, the behavior of the MOSFET gate voltage, Vg, is reflected in the behavior of the voltage, Vgd, which drives the primary winding of transformer 136 and, as a result, the voltage Vgd may be used to generate the signal END. FIG. 11D, for example, illustrates the behavior of Vgd for the gate driver circuit 122 of FIG. 9. At time t3 the high impedance driver impresses Vcc across the primary of the transformer 136, reflecting a voltage Vcc/N2 into the secondary winding and signaling the driver logic 140 to discharge the MOSFET gate. Between t=t3 and t=t4, the gate voltage is discharging, but, since Vg remains above Vcc/N2, the diode 138 remains reverse biased and the transformer 136 sees essentially no loading. At time t=t4, however, the gate voltage drops below Vcc/N2 and a low-impedance load (due to switch 142, which is on, in series with diode 138) appears at the secondary of transformer 136. The high-impedance primary driver (e.g., switch 132 and resistor 134) is unable to support this load and the voltage Vgd (FIG. 11D) rises sharply at t=t4. This sharp rise in Vgd (137, FIG. 11D) may be used as an accurate indicator that the MOSFET has become non-conductive.

FIG. 12 shows various ways of using a current transformer to generate the signal EOC, indicative of the time at which current in the transformer 15 secondary, Is1, returns to zero. FIGS. 12A and 12B show a current transformer 82 connected in series with the secondary and primary windings, respectively, of a converter leakage-inductance transformer 15. In each Figure, signal processing circuitry 171 derives the signal EOC from the current, Is2, which flows in the current transformer 82 secondary winding. The signal processing circuitry might be of the kind shown in FIG. 1, and previously described, or it might simply be a comparator which compares the current Is2 to an appropriate threshold. Alternatively, the circuitry might generate an EOC signal based upon the time-rate-of-change of the current in the transformer 15 (e.g., Ip or Is1). For example, FIG. 12C shows a passive circuit which can generate a positive rate-of-change of voltage at the time that the secondary current Is2 returns to zero. In FIG. 12C, the rise and fall of primary current, Ip, causes current Is2 to flow in the secondary of the current transformer. As shown in FIG. 12D, and previously discussed with reference to FIG. 4, the current Is2 will cross through zero prior to the secondary current, Is1, reaching zero. Capacitor 177 and resistor 178 produce a signal EOC which is closely proportional to the time rate-of-change of the voltage vs2. When current Ip (and Is2) first begins flowing (at time t=t1, FIG. 12D) the voltage rs2 will rise until it is clamped by diode 175 and the signal EOC (FIG. 12E) will rise and fall for a short period of time following t1. Between t1 and t2 the clamping effect of the diode 175 results in an essentially zero rate-of-change, and EOC is essentially zero. Around time t=t2, when the current Is2 crosses zero, the diode becomes non-conductive, the current Is2 flows in resistor 176, and the voltage, rs2, goes negative. At time t=t4, EOC will exhibit a sharp positive rate-of-change indicative of the current Is1 returning to zero.

Figure 13A:
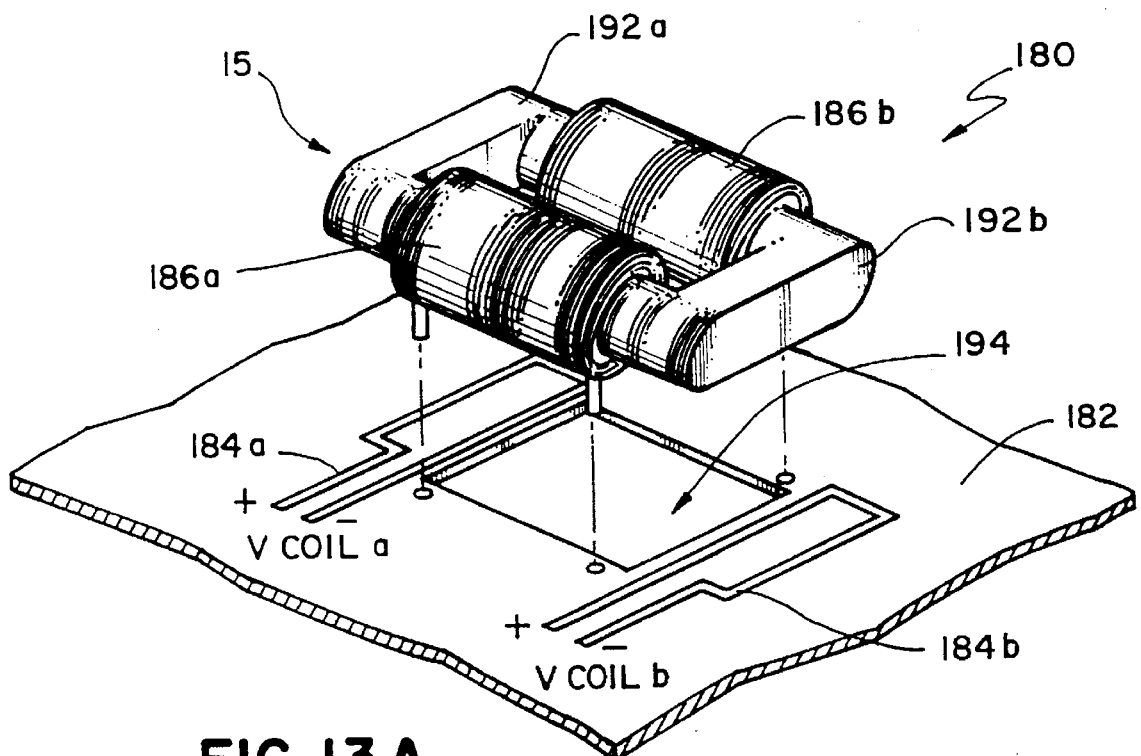
FIGS. 13A and 13B show an exploded perspective view and a side view, respectively, of a transformer arranged upon a substrate which incorporates flux sensing coils.
Figure 13B:
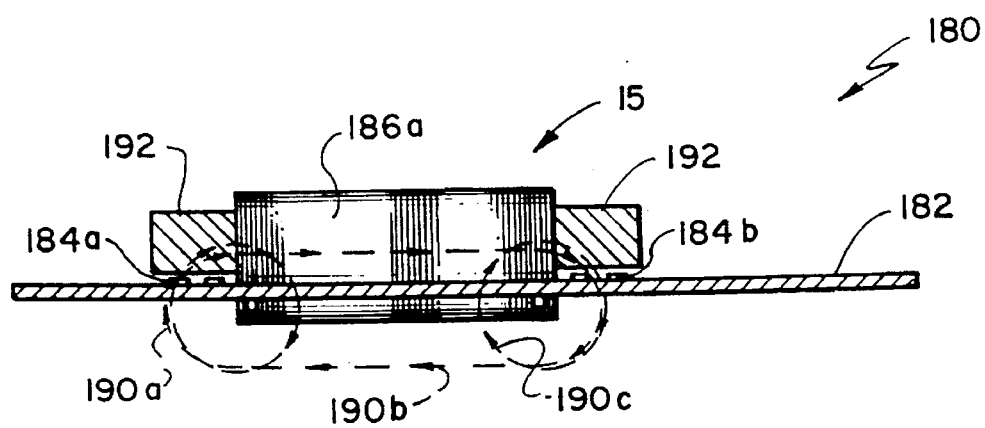
Figure 14C:
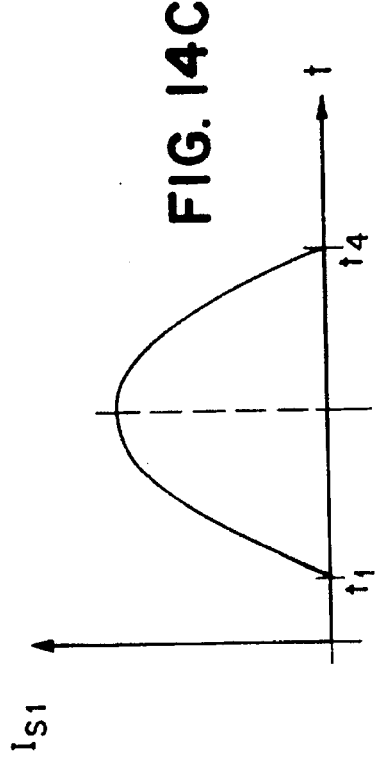
FIGS. 14A through 14D show operating waveforms for the flux sensing arrangement of FIGS. 13A and 13B.
Figure 14D:
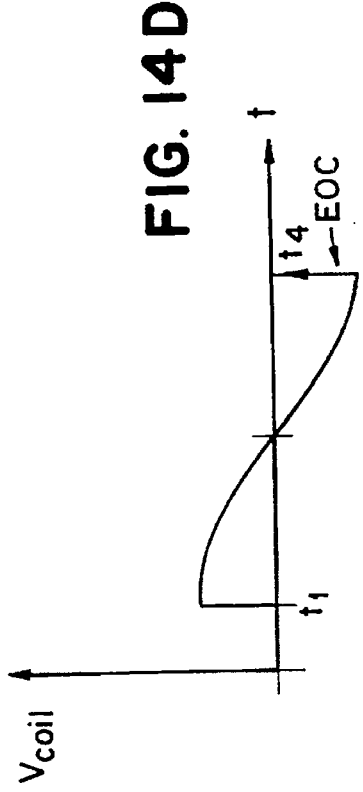
Figure 14A:
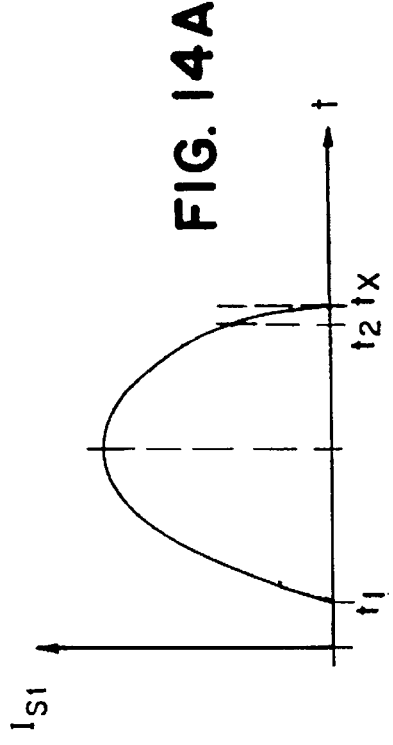
Figure 14B:
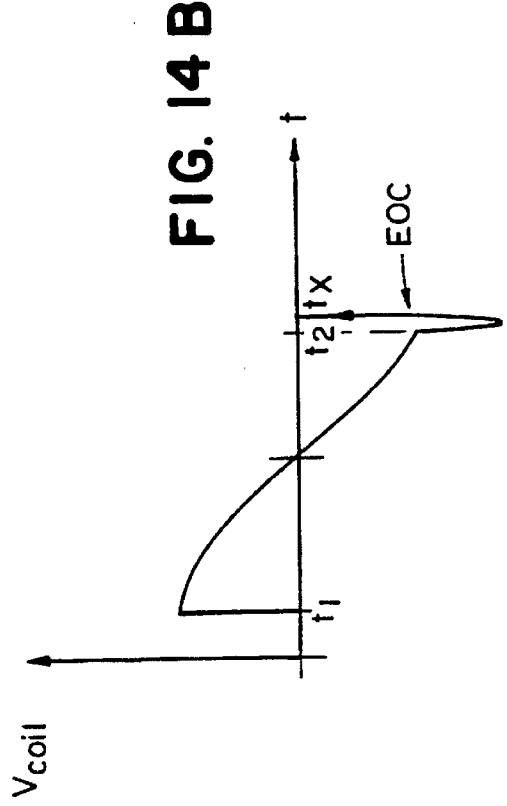

Another way of generating EOC is illustrated in FIGS. 13A and 13B. In the Figures a leakage-inductance transformer 15 is shown to comprise two windings on bobbins 186a, 186b and a permeable magnetic core 192 which links both windings. The transformer is mounted to a substrate (e.g., a printed circuit board) 182 in such a way that the windings pass through a hole 194 in the substrate and the bottom surfaces of the ends of the core 192 lie essentially flush with the surface of the substrate. Loops 184a, 184b, formed of conductive runs on the substrate 182, lie underneath the permeable core 194 at the ends of the transformer. When operating in a ZCS converter, the time variations in the leakage flux of such a transformer (e.g., flux lines which couple one, but not both, of the windings 186a, 186b, such as flux lines 190a, 190b, and 190c in FIG. 13B) will closely follow the time variations of the secondary current Is1. Since the voltage induced in a coil is proportional to the time rate-of-change of flux which couples the winding, the voltages induced in loops 184a, 184b, vcoila and vcoilb, will be proportional to the time rate-of-change of Is1. Thus, an EOC signal derived from either loop (e.g., the voltage vcoila or vcoilb), or from interconnection of one or more of such loops, will have a waveshape indicative of the time rate-of-change of Is1. For example, FIGS. 14A and 14B show the waveforms of Is1 and vcoil for a ZCS converter in which the switch "chops" primary current (e.g. at time t2) by being opened prior to the time at which Is1 would otherwise naturally return to zero. FIGS. 14C and 14D show waveforms for the case where the switch is turned off at or after the time at which Is1 returns to zero (e.g., at time t=t4). In both cases, the sharp positive-going transition in the vcoil waveform indicates clearly when the current Is1 returns to zero and may therefore be used as the EOC signal.

One key benefit of using the approach shown in FIG. 13 is that a single arrangement of loops 184a, 184b may be used for a wide variety of converter models. This is in contrast to schemes in which a current transformer (e.g., as in FIG. 12C) or other current sensing device (e.g., a resistor) is used to directly measure current and in which the current sensing device must be arranged on a case-by-case basis to accommodate the specific levels of primary or secondary currents which characterize each particular converter model. For example, a converter model which accepts a 300 VDC input and delivers a 5 Volt output at 300 Watts will have markedly different secondary (or primary) current values than a converter model which accepts a 12 Volt input and delivers a 48 Volt output at 50 Watts. On the other hand the signal interface levels in the control circuitry in both converters will likely be the same (e.g., the circuitry may require that the EOC signal be several hundred millivolts in peak value). Under this circumstance, a variety of different current transformers (or other sensors) would have to be maintained in inventory to construct a variety of differing converter models. In the approach of FIG. 13, however, each transformer 15 will ordinarily be designed (e.g., by selecting pairs of bobbins having appropriate numbers of turns on their windings 186a, 186b) so that the flux swing in the transformer is within a predefined range. Since the voltage vcoil is a function of flux swing in the transformer, a single pattern of loops 184 on a substrate 182 can be used, without modification, to generate the EOC signal in a virtually unlimited number of different converter models.

Operation of the ramp generator 192 and servo voltage controller 194 of the converter 100 of FIG. 9 will be explained with reference to FIGS. 9 and 10. We assume at the beginning of a converter operating cycle that capacitor 208 is discharged (e.g., the voltage Vr is essentially zero); that the servo voltage, Vs, is at a positive value greater than zero; that the signal GL, output by comparator 296, is low; and that the converter is delivering an average load power, Vout*Io, where Io is the average current delivered to the load and Vout is the DC voltage across the load. We will also temporarily assume that the value of Vsc, delivered by the limiter circuit 297, is equal to the voltage Vs, delivered by the servo controller 194. Two cases, illustrating how the servo controller 192 adjusts the servo voltage, Vs, to cause the MOSFET switch 222 to become non-conductive at essentially the same instant in time that the secondary current, Is1, returns to zero, will be described: one in which the switch 222 is opened prematurely during a converter operating cycle, and the other in which the switch is opened late.

Figure 15:
FIGS. 15A through 15H show waveforms for the converter of FIG. 9 for a case in which the switch is turned off early.
Figure 15:
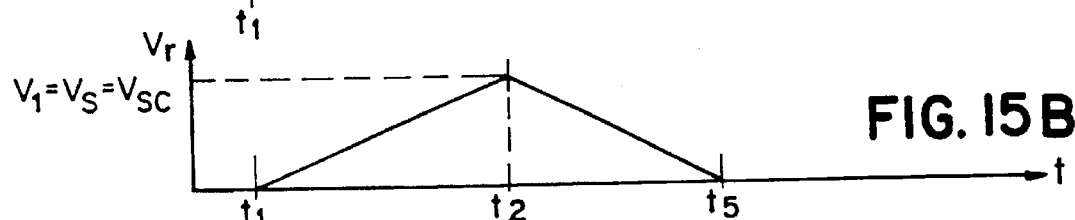
Figure 15:
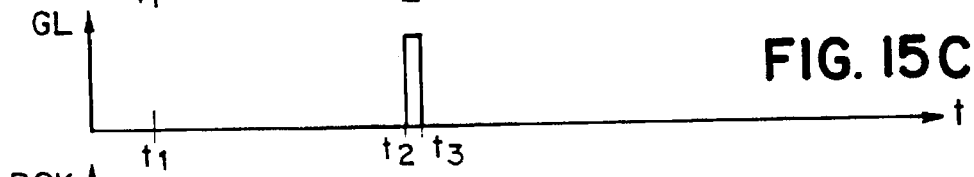
Figure 15:
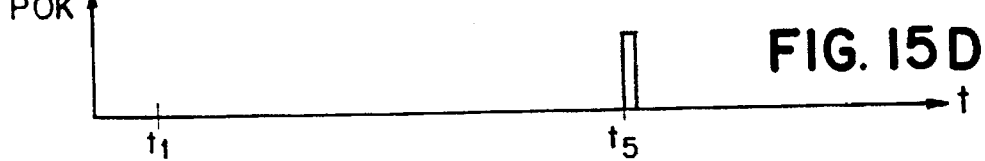
Figure 15:
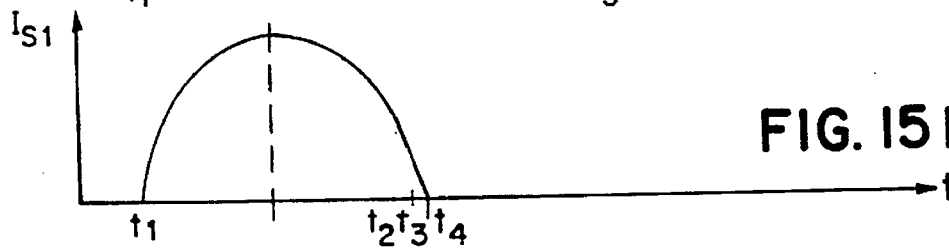
Figure 15:
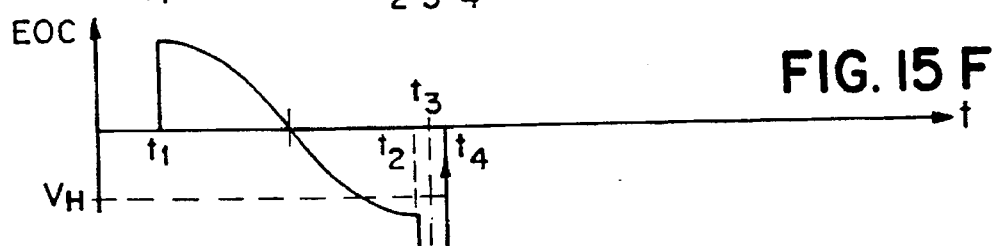
Figure 15:
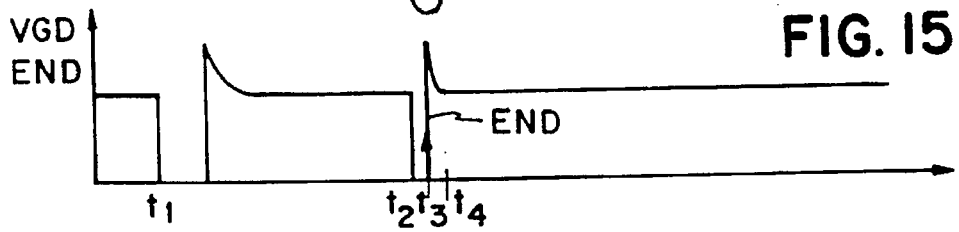
Figure 15:
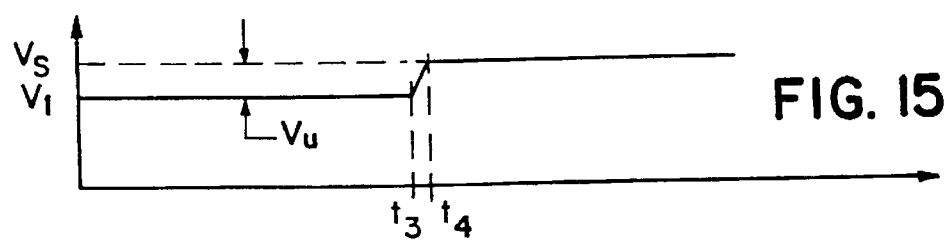

With reference to FIG. 15A, at time t=t1 a turn-on pulse is delivered to the ramp generator 192 setting the output of flip-flop 200 and generating a signal Vi. This enables switched current source 204 which begins charging ramp capacitor 208 with a current Iy (switched current sources 204, 208 are of the kind which deliver a predetermined value of current when enabled and which are essentially an open circuit when disabled) thereby causing the voltage Vr to ramp up linearly (FIG. 15B). The output of flip-flop 200, Vi, also sets the output of flip-flop 298 which triggers monostable 126, causing low-impedance driver 130 to turn on MOSFET 222 via the gate driver circuit 122. This initiates a forward energy transfer cycle as indicated by the flow of secondary current, Is1, in FIG. 15E. At time t=t2 the voltage Vr equals the voltage Vs=Vsc=V1 and the output of comparator 296 goes high, generating the signal GL, resetting flip-flop 298 and causing the high impedance driver 132,134 to turn the MOSFET switch 222 off via gate driver 122. As previously discussed with respect to FIG. 11D, the sharp rise in the voltage Vgd at time t3 (FIG. 15G) is delivered as the signal END to the servo voltage controller 194. The waveforms of FIG. 15 are for a value of Vs which results in the switch 222 being opened too early; secondary current, Is1, is being interrupted (FIG. 15E) prior to the time at which the current would have otherwise naturally returned to zero.

Referring now to FIG. 10, the servo voltage controller 192 is in an essentially dormant state (i.e., all transistors are off and no current is being drawn from the Vcc source) until the signal GL is generated at time t=t2. Delivery of the signal GL causes the circuit to be biased on via transistors Q1 through Q4. For example, if the peak value of the signal GL is 6 Volts, then the value of the bias voltage at the bases of transistors Q19 and Q20 will be approximately 6 Volts minus three Vbe drops (e.g., 6 V−3*0.6 V=4.2 V), whereas the value of the bias voltage at the bases of transistors Q17 and Q18 will be approximately 6 Volts minus two Vbe drops (e.g., 6 V−2*0.6 V=4.8 V). If, as indicated in FIG. 15F, the value of EOC is below a holdoff threshold, Vh, of approximately −250 millivolts, at time t2, then transistors Q13 and Q15 will be held off (via transistor Q11) when the controller 194 is activated by the signal GL (transistor Q10 acts to clamp negative values of EOC which are greater than approximately −0.6 volts). Since the signal END is low at time t2, transistors Q14 and Q16 are also off. As a result, the currents Ic1 and Id1 are supplied by transistors Q17 and Q18, transistors Q19 and Q20 are off, and no net current flows into or out of the servo capacitor 212. At time t=t3, however, END goes high and transistors Q14 and Q16 turn on; as a result, Q20 remains biased off, but Q17 turns off and Q19 is enabled. Current Ic2 is delivered by transistor Q19 and, via the current mirror formed by transistors Q21 and Q22, flows into the servo capacitor 212, increasing Vs. A short time later, as the current Is1 returns to zero, the signal EOC collapses toward zero volts and transistors Q13 and Q15 turn on. This turns off Q19 and the flow of current into capacitor 212 ceases. The net result is that the voltage, Vs, is increased (e.g., by an amount Vu, FIG. 15H), which will increase the switch on-time, t2-t1 (FIG. 15), during the next converter operating cycle.

It should be noted that the process described above is very brief. In a typical converter, for example, the time t2-t1 might be in a range of 400 to 800 nanoseconds and the fall time for the current, t4 - t2 (FIG. 15E), might be on the order of 40 to 100 nanoseconds. The time elapsing between END (t3, FIG. 15G) and EOC (t4, FIG. 15E) might be 20 nanoseconds. The pulse width of GL is not critical; as GL goes high and biases the servo controller 194 circuitry on, the charge stored in the collector capacitances of the transistors within the controller 194 will be sufficient to support circuit operation throughout the brief time that it must remain enabled.

Figure 16:
FIGS. 16A through 16H show waveforms for the converter of FIG. 9 for a case in which the switch is turned off too late.
Figure 16:
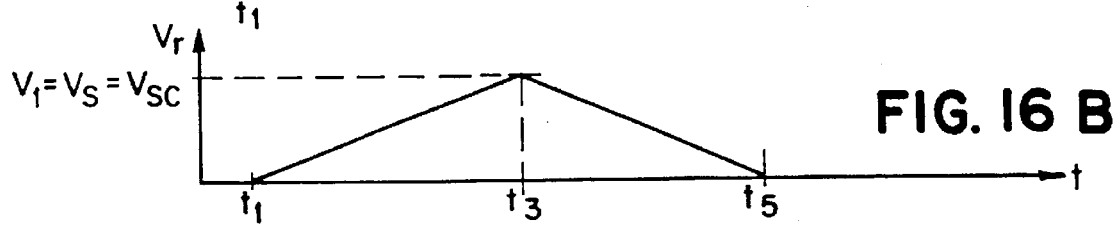
Figure 16:
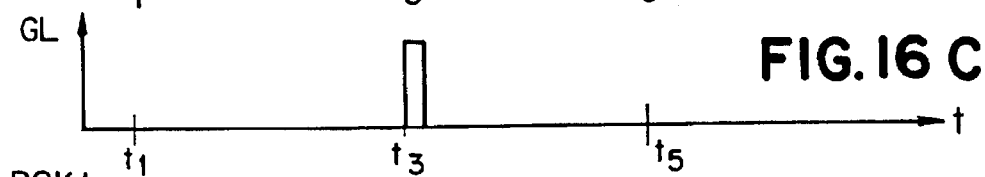
Figure 16:
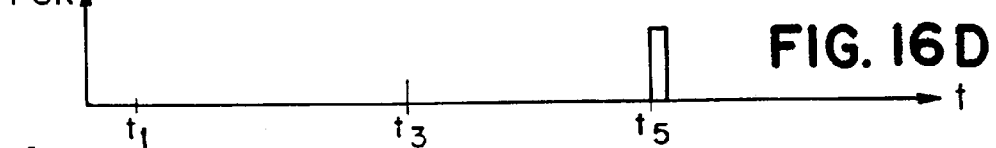
Figure 16:
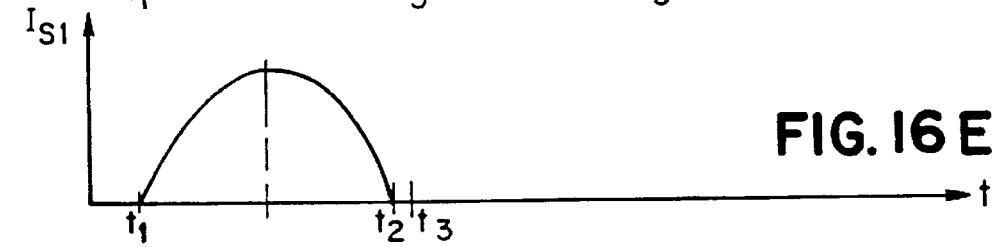
Figure 16:
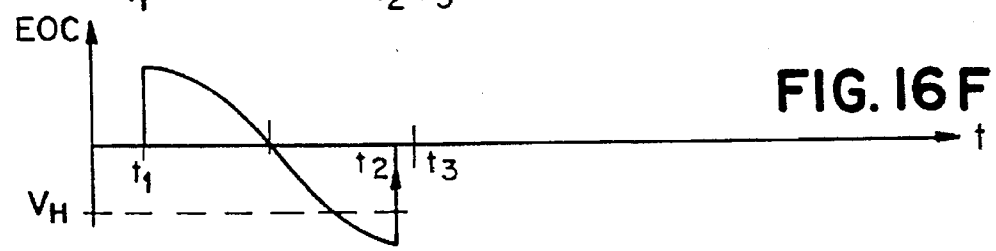
Figure 16:
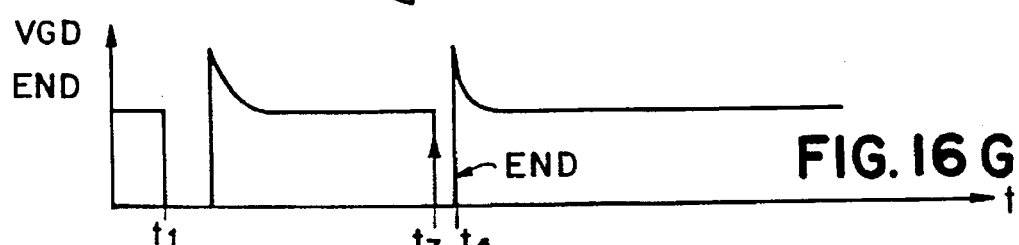
Figure 16:
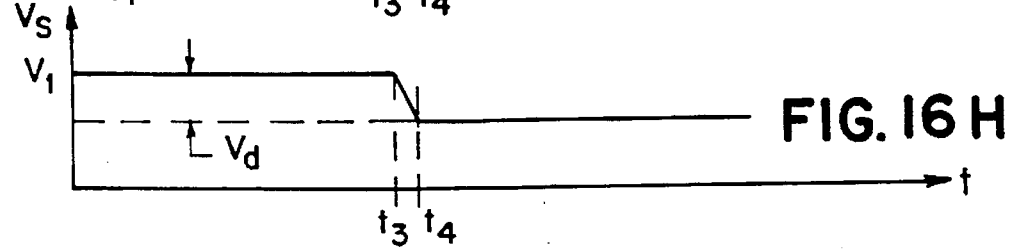

FIG. 16 illustrates circuit operation for the case where the switch 222 is being turned off too late. At time t=t1 a turn-on pulse is delivered to the circuit (FIG. 16A) and, by the same process described above with reference to FIG. 15, the switch 222 is turned on. The current in the secondary Is1 rises and falls and returns to zero at time t=t2 (FIG. 16E), at which time the signal EOC also returns to zero. At time t=t3 the voltage Vr rises to equal the voltage Vs=Vsc=Vs1 and the GL signal is generated. This activates the servo controller 194, as previously described. However, since the signal EOC is at zero volts at t=t3, and this is above the holdoff threshold, Vh, transistors Q13 and Q15 will turn on, transistors Q18 and Q19 will be disabled, and transistor Q20 will be enabled. Current Id2 will be sourced out of the servo capacitor 212, decreasing the voltage Vs. A short time later, at time t=t4, the END signal appears and the current Id2 is interrupted. The result is that the voltage, Vs, is decreased (e.g., in an amount Vd, FIG. 16H), which will decrease the switch on-time, t3-t1 (FIG. 16), during the next converter operating cycle.

In either case, the servo controller 194 will adjust the voltage Vs, on a cycle-by-cycle basis, so as to automatically cause the time at which the switch becomes non-conductive to correspond to the time that the secondary current, Is1, returns to zero. It is to be noted that the relative values of the resistors 201, 203 which set the values of currents, Ic2 and Id2, which charge and discharge the servo capacitor 212, are in a ratio of approximately 4:1. As a result, the incrementing effect of the controller on Vs, and hence upon the on-time of the switch, is substantially greater when current is being "chopped" during an energy transfer cycle (e.g., as in FIG. 15) than it is if the switch is left on beyond the end of the cycle (e.g., as in FIG. 16). One reason for this difference is that stresses on the switch are typically considerably greater if the switch is turned off a bit too soon than they are if the switch is turned off too late by an equivalent amount of time. This is because turning the switch off a certain amount of time in advance of the time at which the secondary current would otherwise return to zero causes the switch to interrupt a significantly larger amount of current than it would have to interrupt if it were turned off too late by the same amount of time (see, for example, FIG. 3). Thus, if the converter enters a mode in which it is "chopping" current during an energy transfer cycle, the relatively large charging current, Ic2, will force a coarse correction in the switch on-time, in many cases causing it to a assume a value which will result in the switch being on too long during the next operating cycle. During subsequent cycles, however, the relatively low discharge current, Id2, will bring the on-time back toward its optimal value in a series of finer corrections. This asymmetry in the response of the servo controller actually improves system stability: the potentially most serious timing errors (those that tend toward "chopping" of current during the energy transfer cycle) evoke a strong control response which biases the switch on-time into the less serious region of error (too long a turn-on time). The controller then converges more slowly upon a stable and final operating point.

The ramp generator 192 of FIG. 9 is arranged so that both the charge and discharge times of the duty cycle capacitor 208 are controllable. Furthermore, once a turn-on pulse initiates a charge cycle, the generator 192 is disabled from responding to another turn-on pulse until both the charge and discharge cycles are completed. For example, in FIGS. 15 and 16, the rate at which the voltage Vr ramps up toward Vsc is proportional to the current Iy. When Vr becomes equal to Vsc, the signal GL is generated; flip-flop 200 is reset and flip-flop 202 is set; switched current source 204 is disabled and switched current source 208 (of value Ix) is enabled; and the duty-cycle capacitor 208 begins to discharge. The rate of discharge of Vr will be proportional to the current Ix. When the voltage Vr declines to zero, flip-flop 202 will be reset by the POK signal output of comparator 210 (at time t=t5, FIGS. 15D and 16D). Between times t1 and t5 the output of the inverting-OR gate 213 will be low, and the ramp generator will be disabled from responding to another turn-on pulse. Thus, irrespective of the rate at which turn-on pulses arrive at the ramp generator 192 (e.g., from voltage controller 60), the ramp generator cannot turn the switch 222 on and off at a duty cycle, D=ton/(ton+toff), greater than Dmax=Ix/(Iy+Ix).

Figure 17:
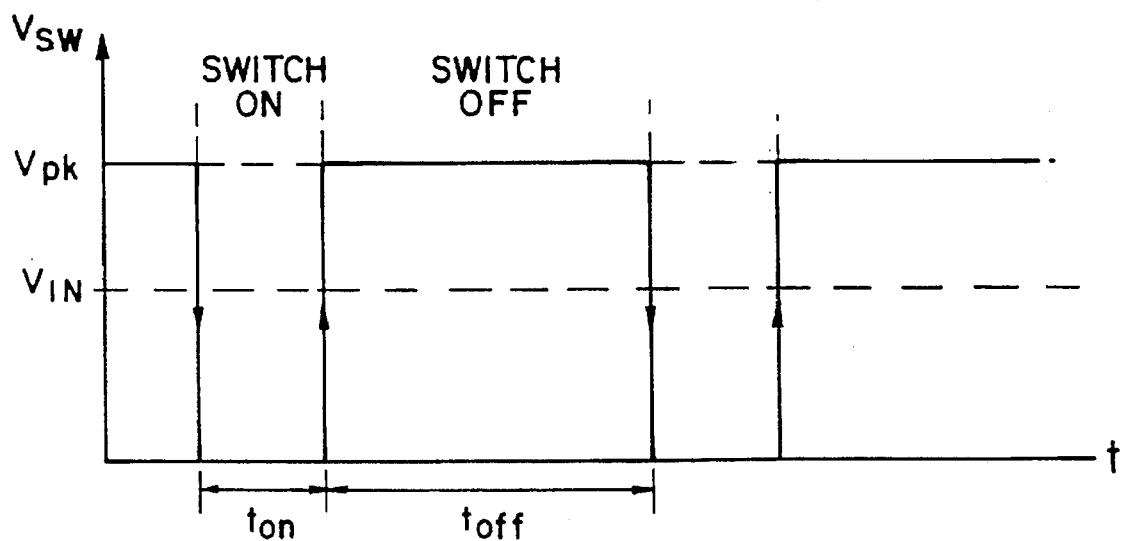
FIG. 17 illustrates the relationship between peak switch voltage and duty cycle.

In another aspect, then, the invention features means for automatically controlling the maximum duty cycle of the converter 100 by adjustment of the absolute and relative values of the currents Iy and Ix. Assume, for example, that MOSFET switch 222 has a maximum allowable breakdown voltage rating Vp. As illustrated in FIG. 17, the peak voltage across the switch, Vpk, will be a function of converter duty cycle and input voltage:

$$Vpk=Vin/(1-D) \qquad (1)$$

If the charge current Iy is made proportional to Vin, and the discharge current Ix is made proportional to (Vp−Vin), then Dmax=(Vp−Vin)/Vp=(1−Vin/Vp) and, inserting this result into Equation 1, the limiting effect of the maximum duty cycle will prevent the switch voltage from ever exceeding a value equal to Vpkmax=Vin/(1−Dmax)=Vp.

Figure 18:
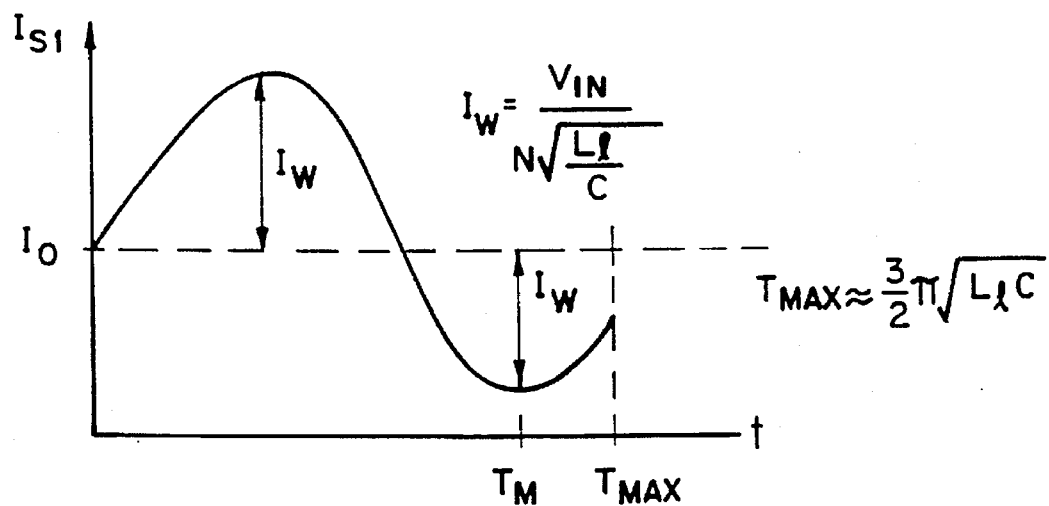
FIG. 18 shows a waveform in a ZCS converter under non-zero-current switching conditions.
Figure 19:
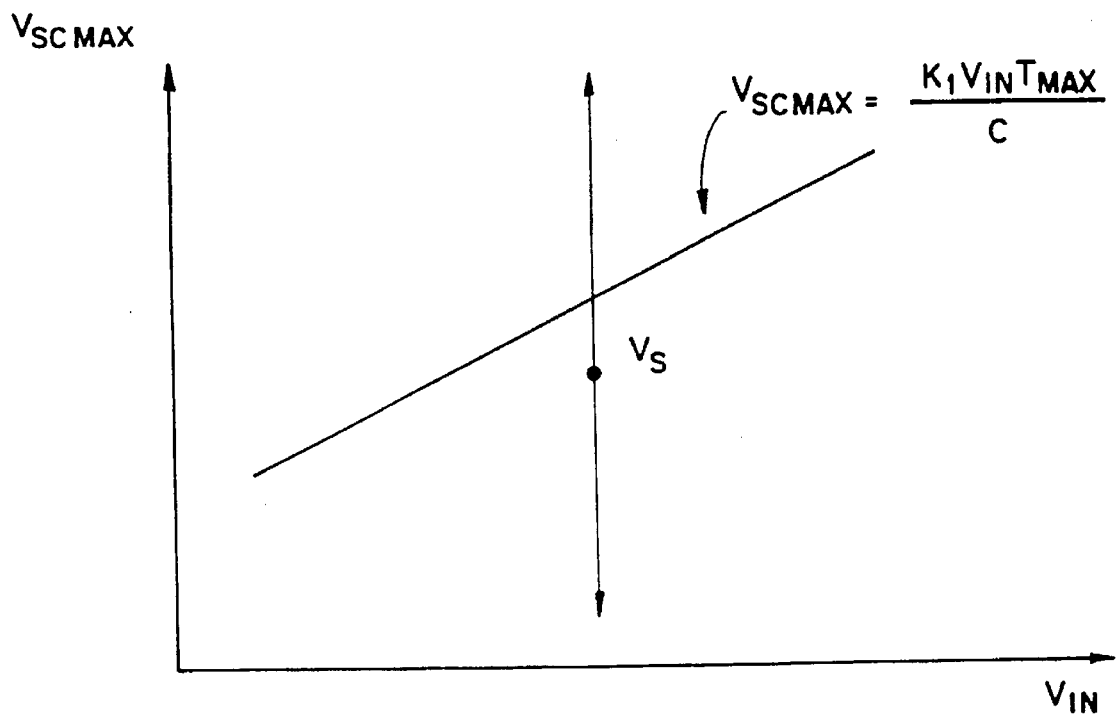
FIG. 19 shows one characteristic of a limiter circuit useful in the converter of FIG. 9.

The limiter circuit 297 is used to provide upper (and lower) limits on switch 222 on-time, and, when used in combination with appropriate duty-cycle limits, as described above, can ensure that, under transient or abnormal conditions, the converter will always converge on a duty cycle which provides for zero-current switching. For example, with reference to FIGS. 9 and 2A, the maximum value of on-time in a ZCS converter which is consistent with zero-current switching is approximately Tm=(3/2)*pi*sqrt(L1,C), where L1 is the secondary-reflected value of the leakage inductance of the transformer 15 and C is the capacitance of capacitor 20. There are operating conditions, however, under which zero current switching cannot occur, or for which the servo voltage controller 194 cannot find a stable operating point. For example, if the converter of FIG. 9 is operated at excessive load (e.g., for which Io is greater than Iw), or if the input voltage Vin drops below a value Iw*N*sqrt(L1*C) then, as shown in FIG. 18, the secondary current, Is1, (and hence the primary current, Ip) will not return to zero. Under such a condition, non-zero current switching will occur regardless of the value of Vs generated by the servo controller 194 and, to prevent grossly excessive switch loss or switch failure, it will be desirable to set a maximum limit on switch on-time (e.g., time t=Tmax in FIG. 18). This may be done by using the limiter 297 to set an appropriate upper limit on Vs. For example, assume that the value of Iy, which charges the duty cycle capacitor 208, is proportional to Vin (e.g., Iy=K1*Vin), as described above. Then, if the limiter 297 limits the maximum value of Vsc to a value Vscmax=(K1*Vin*Tmax)/C (FIG. 19), then switch turn-off will be forced to occur at a time no later than Tmax, irrespective of the value of Vs. As also indicated in FIG. 19, a lower limit, Vscmin, may also be set by means of limiter 297. As Vs varies above and below the two limits, the maximum and minimum value of Vsc will be limited to the values defined by Vcsmax and Vscmin, respectively.

If, in addition to incorporating the on-time limit shown in FIG. 19, the value of the discharge current Ix is reduced in an amount proportional to the difference between Vs and Vscmax whenever Vs becomes greater than Vsmax, then, under abnormal conditions which would otherwise cause non-zero-current switching operation, the duty cycle of the converter will always self-adjust downward to converge on an operating frequency at which zero-current switching just occurs. If Ix is set proportional to (Vp−Vin) (e.g., Ix=K1*(Vp−Vin)) when Vs is below Vsmax, as previously discussed, and Ix is also further reduced in amount proportional to the difference between Vs and Vsmax when Vs is above Vsmax, (e.g., Ix=K1*(Vp−Vin−K2*(Vs−Vsmax)), where K2 is relatively large), then converter duty cycle will be automatically adjusted such that the maximum switch voltage limit is observed and that steady-state operation under non-zero-current switching conditions will not occur.

Figure 24:
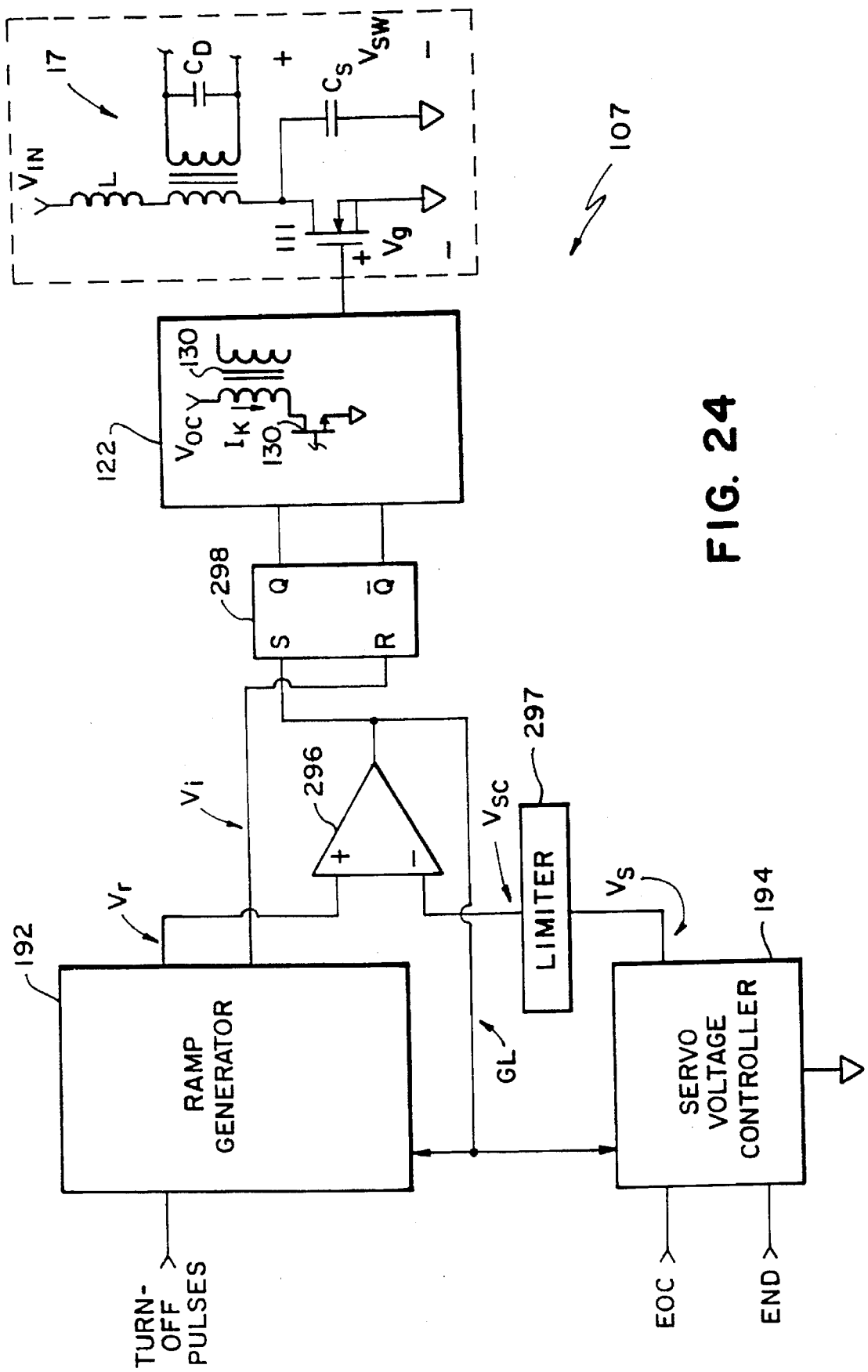
FIG. 24 is a schematic of an embodiment of ZVS converter which includes a servo voltage controller according to the present invention.
Figure 25C:
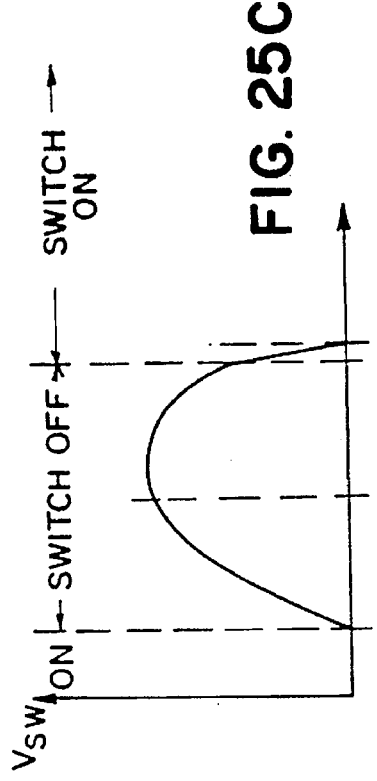
FIGS. 25A through 25E show how the EOC signal may be generated in the converter of FIG. 24.
Figure 25D:
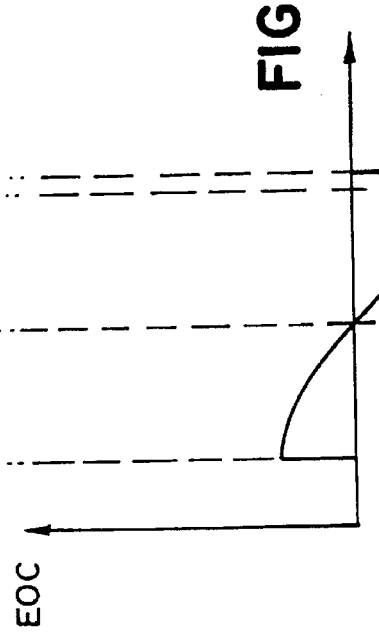
Figure 25E:
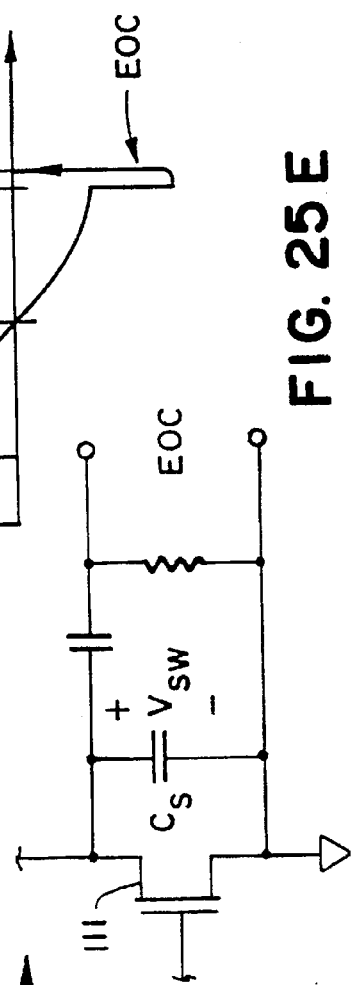
Figure 25A:
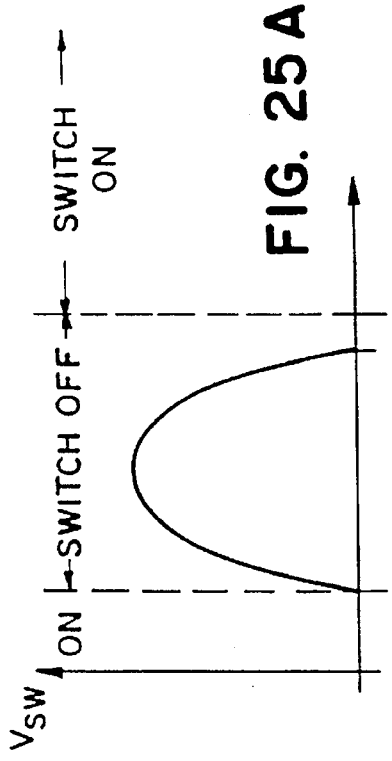
Figure 25B:
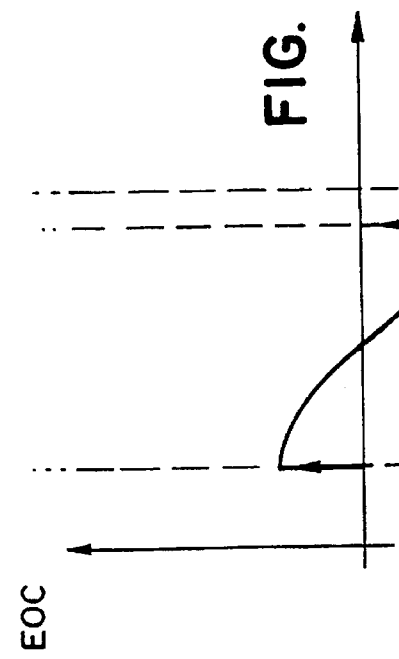

The invention may be applied to any quantized converter to accommodate any particular zero-voltage or zero-current switching strategy. For example, FIG. 24 shows a schematic of an embodiment of a ZVS converter 107 according to the invention. The converter 107 includes the same control elements 192, 194, 296, 297, 298 and gate driver 122 found in the converter of FIGS. 9 and 10 along with a ZVS converter 17 of the kind shown in FIG. 21. A MOSFET switch 111 is shown being used in the ZVS converter 17. Because it is the timing of the turn-on of the switch 111 in the ZVS converter which is critical, the phasing of the switch control in the converter of FIG. 24 is the reverse of that shown in converter of FIG. 9 (note that the inputs to the flip-flop 298 are reversed with respect to the connections in FIG. 9). In FIG. 24 turn-off pulses arrive at the ramp generator 192. Each turn-off pulse starts the ramp-up of the voltage Vr and generates the signal Vi which resets flip-flop 298 and turns off the MOSFET 111 via gate driver 122. When Vr equals Vsc the comparator sets the flip-flop 298 and turns the switch 111 on via the gate driver 122. In this case the signal EOC must be indicative of the time at which the switch voltage, Vsw, returns to zero (e.g. time t=t4 in FIG. 22) and the signal END must be indicative of when the switch becomes conductive. EOC may be generated by using techniques similar to those described above. For example, if an R-C circuit is used to derive an EOC signal based upon the time rate-of-change of the voltage Vsw, as shown in FIG. 25E, then the EOC signal will behave as shown in FIGS. 25B and 25D for cases in which the switch is turned on too late (FIG. 25A) and too early (FIG. 25C), respectively. One way to generate the END signal is based upon the fact that the current, Ik, in the primary of the gate driver transformer will rise and fall (much like the waveform of FIG. 12D) as energy is transferred by the gate driver circuit 122 to the gate capacitance of the MOSFET switch 111 at turn-on. Thus, if a current transformer arrangement similar to that shown in FIG. 12C is placed in series with the high impedance driver 130 of the gate driver circuit 122, the rising edge (e.g., at time t=t4 in FIG. 12E) of the signal generated by the circuit can be used to generate the END signal.

Figure 21:
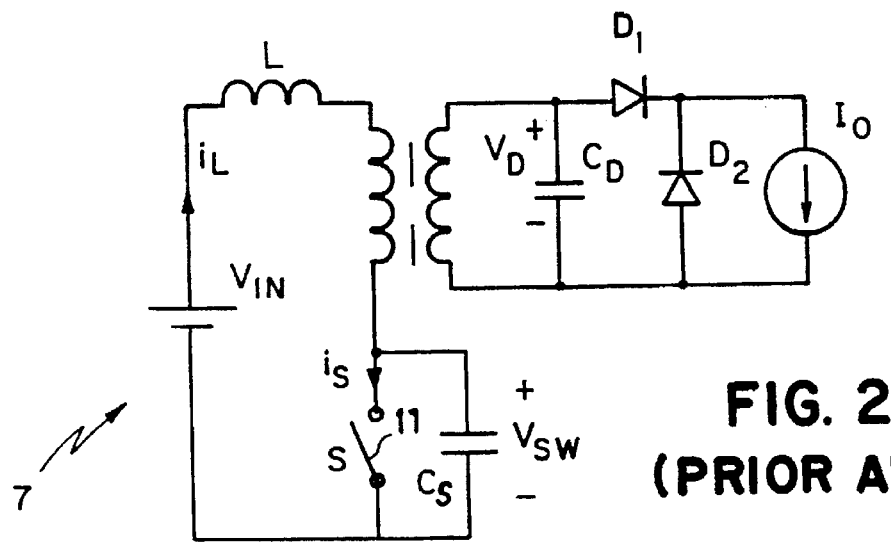
FIG. 21 shows a schematic of a prior art zero-voltage switching converter.
Figure 22:
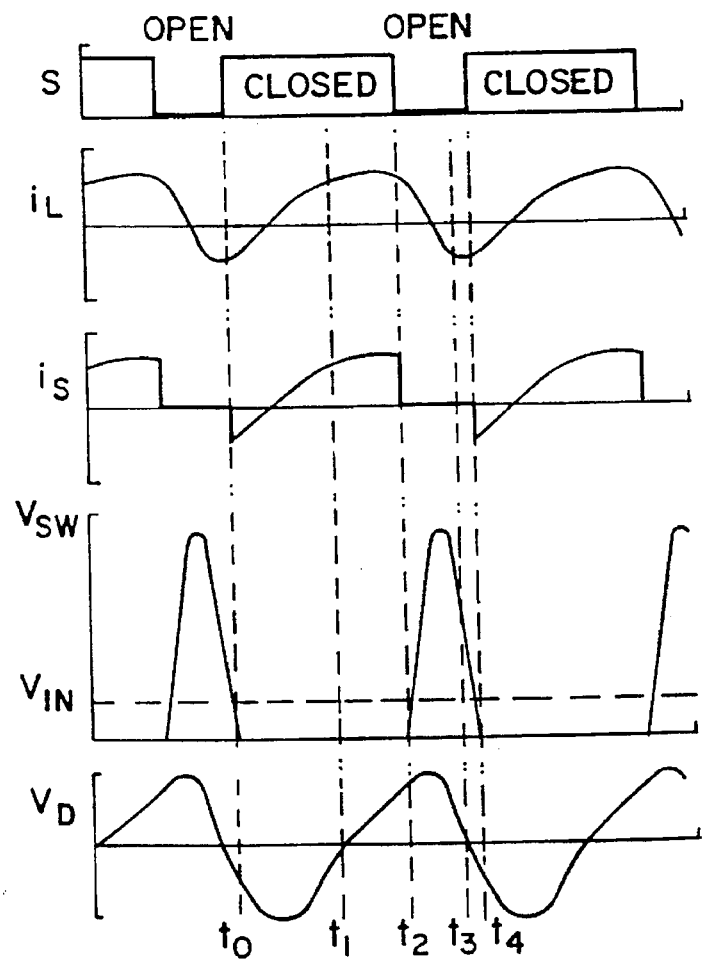
FIG. 22 shows waveforms for the converter of FIG. 21.
Figure 26:
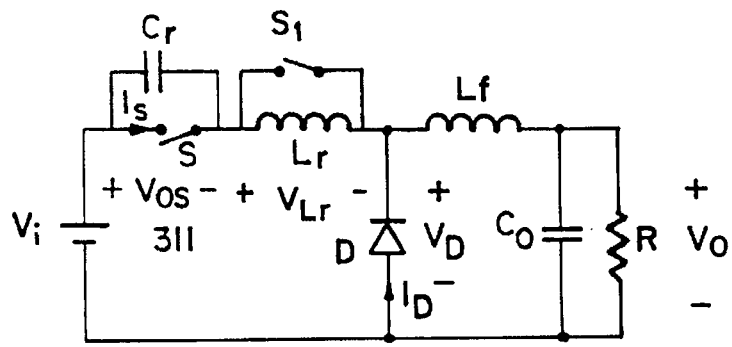
FIG. 26 shows a prior art ZVS-PWM converter.
Figure 27:
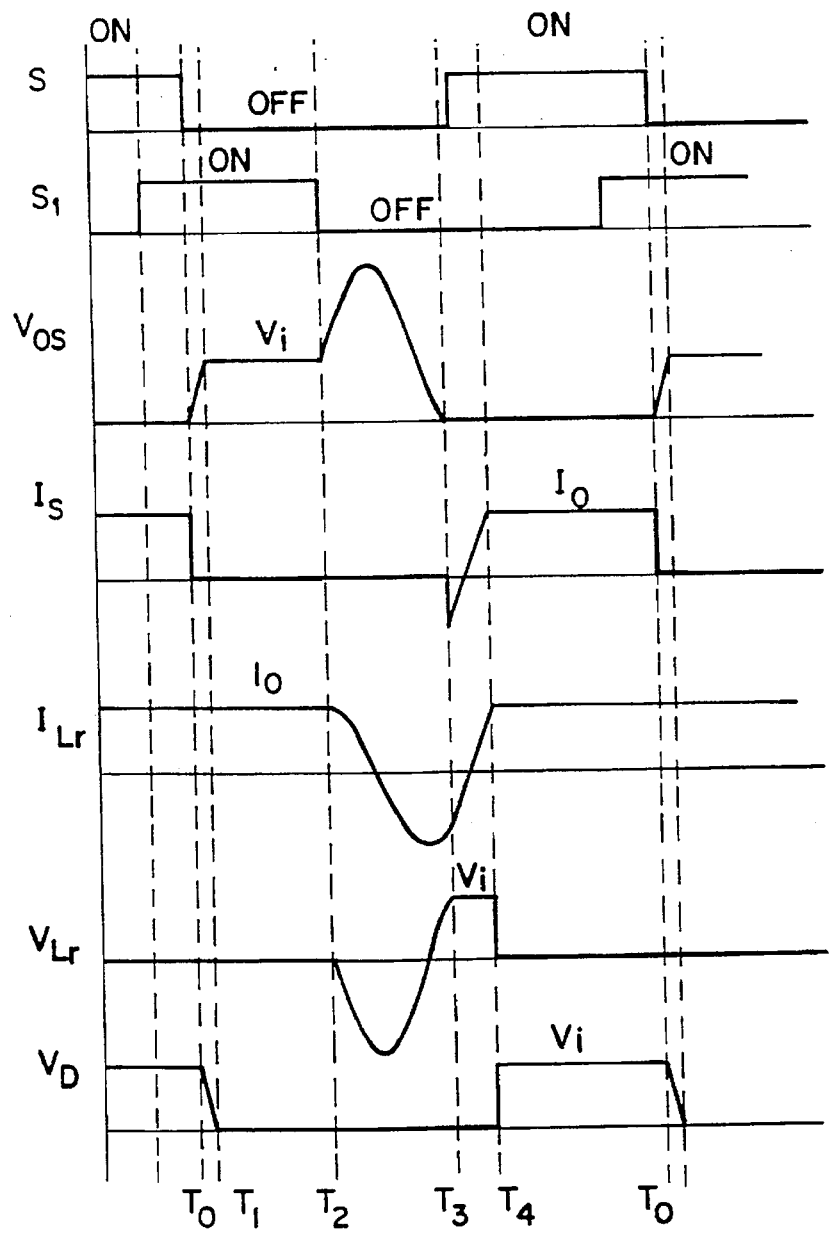
FIG. 27 shows waveforms for the converter of FIG. 26.

Because of the similarity of the switching strategies in the converters of FIGS. 21 and 26, a controller 107 of the kind shown in FIG. 24 may be applied to both.

Figure 20:
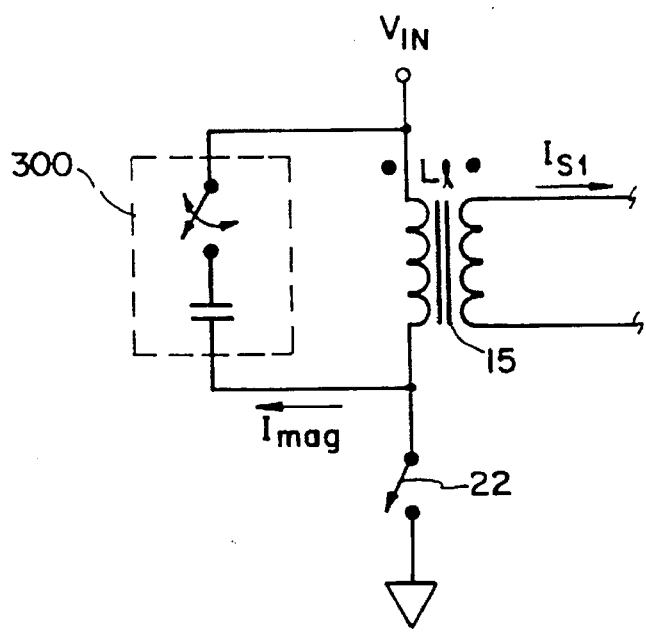
FIG. 20 shows a portion of a ZCS converter including a circuit for resetting the magnetic core of the converter transformer.

The controller 194 of FIG. 10 is not limited to use with MOSFET switches. It will operate satisfactorily if used with any kind of switch (e.g., bipolar transistors, IGBTs) provided only that the signal END is indicative of the point in time at which the conductivity of the switch changes state. Alternate ways of generating the END signal in a ZCS converter include measuring the rate-of-change of voltage across the switch and measuring the flow of current in circuitry used to reset the magnetic core of the converter transformer. For example, in FIG. 20 a portion of a ZCS converter of FIG. 1 is shown to also include a reset circuit 300 of the kind described in Vinciarelli, "Optimal Resetting of the Transformer's Core in Single Ended Forward Converters," U.S. Pat. No. 4,441,146. When the switch 22 becomes non-conductive, magnetizing current, Imag, will flow into the reset circuit and this can be sensed (e.g., by a current transformer or resistor) for use as the signal END.

Figure 9A:
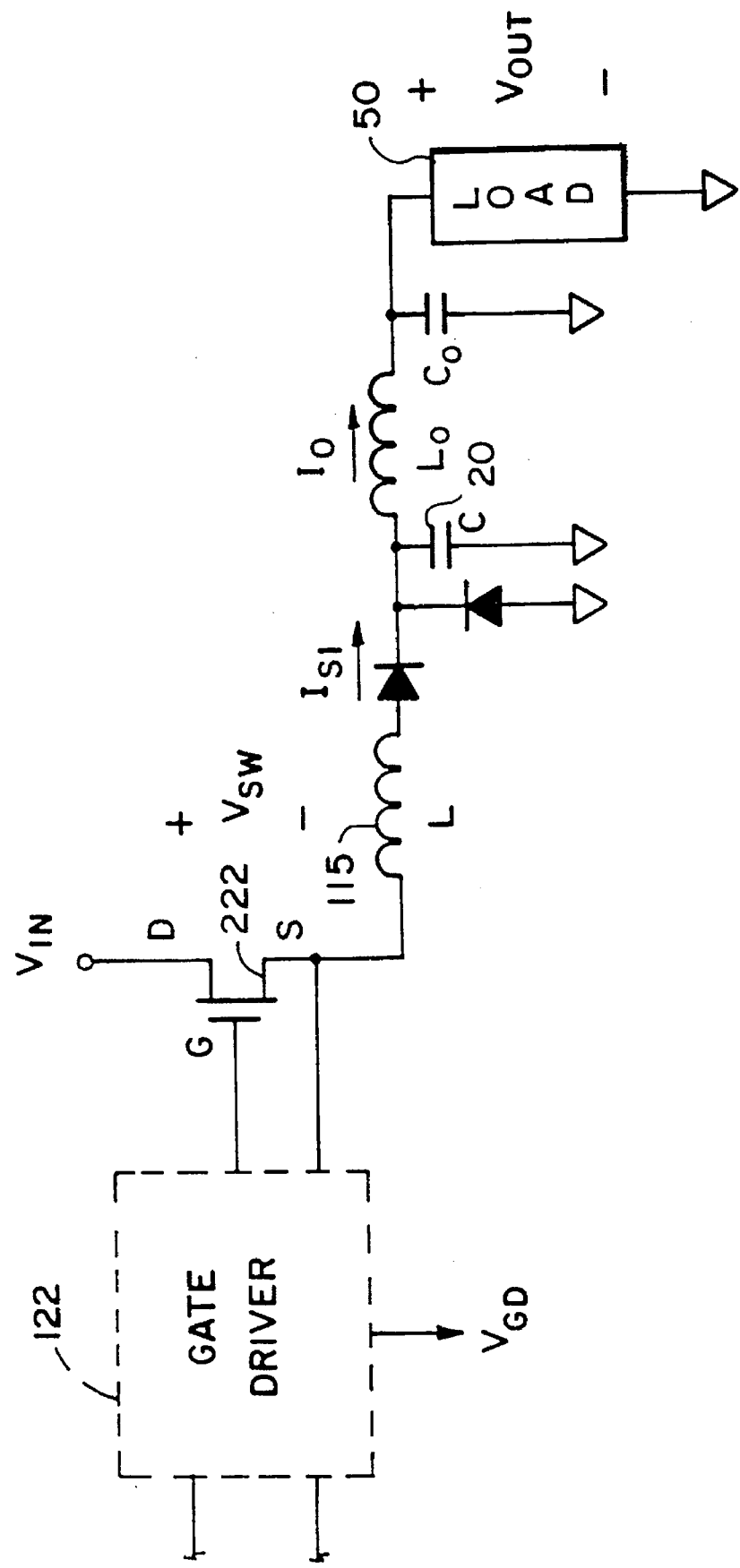

Other embodiments are within the scope of the following claims. For example, the invention can be applied to non-isolated quantized converters (e.g., converters which do not include isolation transformers), including, without limitation, non-isolated versions of all of the converters shown herein. Thus, FIG. 9A shows a portion of the converter of FIG. 9 in which the isolated ZCS buck converter has been replaced with a non-isolated ZCS buck converter (by replacing the leakage inductance transformer 15 with a discrete inductance 115 and eliminating the reset circuit 300). All of the waveforms of FIGS. 15 and 16 remain applicable, except that the current Is1 in the circuit of FIG. 9A now flows in the switch 222 and the EOC signal would correspond to when the switch current (rather than the secondary current) actually returns to zero. The invention may also be applied to regulate the timing of switch transitions in accordance with strategies other than zero current or voltage conditions. For example, the controller could readily be adapted to regulate a transition to occur at a particular value of voltage or current, or to occur at a specific time prior or subsequent to a zero voltage or current condition. In such cases, generation of the EOC signal would be based upon the particular strategy being followed (e.g., the signal might be generated based upon a measurement of switch voltage or current, or based upon the current or voltage reaching a certain value, such as zero, a fixed time the transition occurs).

What is claimed is:

1. Circuitry for use in converting power from an input source for delivery to a load, comprising
   a quantized converter comprising a switch which is controlled to undergo transitions between conductive and non-conductive states in each of a series of converter operating cycles, and
   a switch controller for reducing an error between (i) an actual time of occurrence of a particular one of said transitions in one of said operating cycles and (ii) a desired time of occurrence of said particular transition, based upon information about the value of said error during a previous one of said operating cycles.

2. The circuitry of claim 1 in which said quantized converter comprises a zero-current switching converter.

3. The circuitry of claim 1 in which said converter comprises a zero-voltage switching converter.

4. The circuitry of claim 1 in which said converter comprises a resonant switching converter.

5. The circuitry of claim 1 wherein said desired time corresponds to a time during said one of said operating cycles at which a flow of current within said converter reaches a predetermined value.

6. The circuitry of claim 1 wherein said desired time corresponds to a time during said one of said operating cycles at which a flow of current indicative of the flow of current in said switch reaches a predetermined value.

7. The circuitry of claim 1 wherein said desired time corresponds to a time during said one of said operating cycles at which the flow of current in said switch reaches a predetermined value.

8. The circuitry of claim 1 wherein said desired time corresponds to a time during said one of said operating cycles at which a voltage in said converter reaches a predetermined value.

9. The circuitry of claim 1 wherein said desired time corresponds to the time during said one of said operating cycles at which the voltage across said switch reaches a predetermined value.

10. Any of the circuitries of claims 5 through 9 wherein said predetermined value is essentially zero.

11. Any of the circuitries of claims 5 through 9 wherein said error is reduced essentially to zero.

12. The circuitry of claim 1 wherein said error is reduced essentially to zero.

13. The circuitry of claim 1 wherein said controller detects a time during an operating cycle at which a transition occurs.

14. The circuitry of claim 1 wherein said controller detects a time within one of said operating cycles at which a current indicative of the flow of current in said switch reaches a predetermined value.

15. The circuitry of claim 1 wherein said controller detects a time within one of said operating cycles at which a voltage indicative of the voltage across said switch reaches a predetermined value.

16. The circuitry of claim 1 wherein said controller comprises
   a first detector for detecting a first time within one of said operating cycles at which a transition of said switch occurs,
   a second detector for detecting a second time within said one of said operating cycles at which a current indicative of the flow of current in said switch reaches a predetermined value, and
   a control element for controlling said first time in a subsequent one of said operating cycles based upon the difference between said first time and said second time.

17. The circuitry of claim 1 wherein said controller comprises
   a first detector for detecting a first time within one of said operating cycles at which a transition of said switch occurs,
   a second detector for detecting a second time within said one of said operating cycles at which a voltage indicative of the voltage across said switch reaches a predetermined value, and
   a control element for controlling said first time in a subsequent one of said operating cycles based upon the difference between said first time and said second time.

18. Any of the circuitries of claims 14 through 17 wherein said predetermined value is zero.

19. The circuitry of claims 16 or 17 wherein said control element reduces said difference to essentially zero.

20. The circuitry of claim 1 wherein said controller
- compares a first signal, Vr, indicative of an elapsed time within said one of said operating cycles, to a second signal, Vsc, and
- initiates an occurrence of said particular one of said transitions when said first signal becomes equal to said second signal.

21. The circuitry of claim 20 wherein said controller sets said second signal, Vsc, equal to a third signal, Vs, which is adjusted by the controller based upon the value of said error.

22. The circuitry of claim 20 wherein said elapsed time is the difference between said actual time of occurrence and a time of occurrence of another transition during said one of said operating cycles.

23. The circuitry of claim 21 wherein said controller adjusts said third signal, Vs, so as to reduce said error to essentially zero.

24. The circuitry of claim 23 wherein the value of said second signal, Vsc, is set equal to:
- (i) the value of said third signal, Vs, whenever the value of Vs is within a range defined by minimum and maximum limits, Vscmin and Vscmax, respectively;
- (ii) Vscmin, whenever Vs<Vscmin;
- (iii) Vscmax, whenever Vc>Vscmax.

25. The circuitry of claim 24 wherein the values of Vscmin and Vscmax are arranged to set limits on the minimum and maximum times that said switch can remain in one of said states.

26. The circuitry of claim 25 wherein said limits set minimum and maximum values of the on-time for said switch.

27. The circuitry of claim 24 wherein the values of said limits, Vscmin and Vscmax, are functions of the value of said input source.

28. The circuitry of claim 20 wherein said controller further prevents initiation of another of said operating cycles for a period of time following said actual time of occurrence.

29. The circuitry of claim 28 wherein a duty cycle of said converter is prevented from assuming a value which would cause the voltage across the switch to exceed a predetermined value, Vp.

30. The circuitry of claim 29 wherein said quantized converter comprises a zero-current switching converter and wherein steady state operation of said converter is prevented under non-zero-current switching conditions.

31. The circuitry of claim 20 wherein said first signal increases as said elapsed time increases.

32. The circuitry of claim 31 wherein said controller increases said second signal if said error is negative and decreases said second signal if said error is positive.

33. The circuitry of claim 13 wherein the rate-of-change of voltage across said switch is detected.

34. The circuitry of claim 13 wherein said switch comprises a MOSFET and the time when the gate-to-source voltage crosses the threshold voltage of said MOSFET is detected.

35. The circuitry of claim 13 wherein said converter further comprises an isolation transformer and reset circuitry connected to a winding of said transformer for resetting the magnetic core of said transformer, and wherein the commutation of the flow of magnetizing current between said winding and said reset circuitry is detected.

36. The circuitry of claim 14 further comprising a a current transformer for said detecting.

37. The circuitry of claim 14 wherein the rate-of-change of said current is detected.

38. The circuitry of claim 14 wherein the flux induced by a flow of current in a magnetic component is detected.

39. The circuitry of claim 14 wherein said converter further comprises a leakage-inductance transformer and wherein said controller further comprises a detector for sensing leakage flux emanating from said transformer.

40. The circuitry of claim 39 wherein said detector comprises a conductive loop placed in the vicinity of said transformer.

41. The circuitry of claim 15 wherein the rate-of-change of said voltage is detected.

42. Circuitry for use in converting power from an input source for delivery to a load, comprising
- a zero-current switching converter comprising a switch which is controlled to undergo transitions between conductive and non-conductive states in each of a series of converter operating cycles, and
- a switch controller for reducing essentially to zero an error between (i) an actual time of occurrence of a particular one of said transitions in one of said operating cycles and (ii) a desired time of occurrence of said particular transition, based upon information about the value of said error during a previous one of said operating cycles.

43. A method for use in quantized conversion of power from an input source for delivery to a load comprising
- causing a switch to undergo transitions between conductive and non-conductive states in each of a series of converter operating cycles, and
- reducing an error between (i) an actual time of occurrence of a particular one of said transitions in one of said operating cycles and (ii) a desired time of occurrence of said particular transition, based upon information about the value of said error during a previous one of said operating cycles.

44. A method for controlling a switch in a quantized converter comprising
- determining a first time within an operating cycle of said converter when said switch makes a transition between conductive and non-conductive states,
- determining a second time within an operating cycle of said converter when an electrical parameter associated with said switch reaches a predetermined value, and
- adjusting an occurrence of said transition within a subsequent operating cycle based upon the time difference between said first and said second times.

45. The method of claim 44 wherein said electrical parameter comprises flow of current in said switch.

46. The method of claim 44 wherein said electrical parameter comprises voltage across said switch.

47. The method of claim 44, 45, or 46 wherein said predetermined value is zero.

48. The method of claims 44, 45, or 46 wherein said difference is controlled to be essentially zero.

49. The method of claim 44, 45, or 46 wherein said step of adjusting further comprises
- generating a signal, Vr, indicative of an elapsed time within said operating cycle,
- setting the value of a signal, Vsc, and
- initiating said occurrence of said transition when Vr equals Vsc.

50. The method of claim 49 wherein said step of setting comprises
- setting Vsc equal to a signal, Vs, which is varied based upon said difference.

51. The method of claim 50 further comprising limiting Vsc to vary within a range of values bounded by an upper limit, Vscmax, and a lower limit Vscmin.

52. The method of claim 51 wherein said upper and lower limits are varied as a function of the converter input voltage, Vin.

53. The method of claims 45 or 46 further comprising the step of preventing initiation of another converter operating cycle for a period of time following said first time.

54. The method of claim 44 further comprising the steps of preventing initiation of another converter operating cycle for a period of time following said first time.

55. The method of claim 54 further comprising adjusting said period of time so as to prevent said converter from operating under non-zero-current switching conditions.

56. The method of claims 54 or 55 further comprising the step of adjusting said period of time so as to prevent the converter duty cycle from assuming a value which would cause the voltage across said switch to exceed a predetermined value, Vp.

57. A method for use with a switched quantized converter, comprising measuring the flux induced by the flow of current in a magnetic component included within said converter, and determining a time during an operating cycle of the converter when current in a switch of the converter reaches zero based on the measured flux.

58. The method of claim 57 in which said step of measuring comprises measuring the voltage induced in a conductive loop placed in proximity to said magnetic component.

59. A method for use with zero-current switching converter, of the kind which includes a leakage inductance transformer and a switch, comprising arranging a conductive loop in proximity to said leakage inductance transformer so that leakage flux which emanates from said transformer couples into said loop, measuring the voltage induced in said loop, and determining a time during an operating cycle of said converter when current in the switch reaches zero, based on said measured voltage.

60. A controller for use with a quantized converter of the kind which converts power from an input source for delivery to a load and includes a switch which is controlled to undergo transitions between conductive and non-conductive states in each of a series of converter operating cycles, the controller comprising circuitry for reducing an error between (i) an actual time of occurrence of a particular one of said transitions in one of said operating cycles and (ii) a desired time of occurrence of said particular transition, based upon information about the value of said error during a previous one of said operating cycles.

* * * * *

UNITED STATES PATENT AND TRADEMARK OFFICE
CERTIFICATE OF CORRECTION

PATENT NO. : 5,659,460
DATED : August 19, 1997
INVENTOR(S) : Patrizio Vinciarelli It is certified that error appears in the above-identified patent and that said Letters Patent is hereby corrected as shown below:

Col. 4, ln. 11, "Vs Vscmin" should be --Vs < Vscmin--.

Col. 7, ln. 53, "(Fig. BE)" should be --(Fig. 8E)--.

Col. 8, ln. 44, "123, 2,Vcc/N2" should be --123, 2*Vcc/N2--.

Col. 9, ln. 52, "rs2" should be --vs2--.

Col. 9, ln. 58, "rs2" should be --vs2--.

Col. 13, ln. 53, "(L1,C)" should be --(L1*C)--.

Signed and Sealed this

Twenty-fifth Day of November, 1997

Attest:

BRUCE LEHMAN

*Attesting Officer*  *Commissioner of Patents and Trademarks*